United States Patent
Wagatsuma

(10) Patent No.: US 10,313,536 B2
(45) Date of Patent: Jun. 4, 2019

(54) INFORMATION PROCESSING SYSTEM, ELECTRONIC APPARATUS, INFORMATION PROCESSING APPARATUS, INFORMATION PROCESSING METHOD, ELECTRONIC APPARATUS PROCESSING METHOD AND NON-TRANSITORY COMPUTER READABLE MEDIUM TO CONFIRM DIFFERENCE IN MEETING CONTENTS USING SOUND INFORMATION

(71) Applicant: Konica Minolta, Inc., Tokyo (JP)

(72) Inventor: Yoshifumi Wagatsuma, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/613,932

(22) Filed: Jun. 5, 2017

(65) Prior Publication Data

US 2017/0358323 A1    Dec. 14, 2017

(30) Foreign Application Priority Data

Jun. 10, 2016   (JP) .................................. 2016-116342

(51) Int. Cl.
  *B41J 3/00*    (2006.01)
  *H04N 1/00*    (2006.01)
  (Continued)

(52) U.S. Cl.
  CPC ............ *H04N 1/00188* (2013.01); *B41J 3/44* (2013.01); *G06F 3/0485* (2013.01); *G06F 3/04847* (2013.01); *G06F 3/1285* (2013.01); *G06F 3/1292* (2013.01); *G11B 27/031* (2013.01); *G11B 27/102* (2013.01); *G11B 27/34* (2013.01); *H04N 1/00204* (2013.01); *H04N 1/00267* (2013.01); *H04N 1/00307* (2013.01);
  (Continued)

(58) Field of Classification Search
  CPC . G11B 27/031; G06F 17/241; H04N 1/00188; B41J 3/44
  USPC .................... 715/230; 358/1.13, 1.15, 1.18
  See application file for complete search history.

(56) References Cited

U.S. PATENT DOCUMENTS

| 2002/0078088 | A1 | 6/2002 | Kuruoglu et al. |
| 2003/0081237 | A1* | 5/2003 | Ogiwara ............ H04N 1/00278 358/1.14 |

(Continued)

FOREIGN PATENT DOCUMENTS

JP    2015-208047 A    11/2015

OTHER PUBLICATIONS

Extended European Search Report issued in corresponding European Application No. 17172359.6 dated Oct. 5, 2017 (15 pages).

*Primary Examiner* — Shaun Roberts
(74) *Attorney, Agent, or Firm* — Osha Liang LLP

(57) ABSTRACT

An information processing system that that confirms the meanings of difference information in meeting content with reference to the sound information is provided. Differences between meeting content contained in image information of a paper medium taken at each detection cycle and meeting content contained in master information are extracted. Surrounding sounds are recorded while the meeting is being held. The sound information of the recorded sounds is associated with the difference information of the extracted differences and also associated with the master information with the timing when the differences of the meeting content are detected.

25 Claims, 17 Drawing Sheets

(51) Int. Cl.
- *G11B 27/031* (2006.01)
- *G11B 27/10* (2006.01)
- *H04N 5/765* (2006.01)
- *G11B 27/34* (2006.01)
- *B41J 3/44* (2006.01)
- *G06F 3/12* (2006.01)
- *G06F 3/0485* (2013.01)
- *H04N 1/32* (2006.01)
- *G06F 3/0484* (2013.01)

(52) U.S. Cl.
CPC ..... *H04N 1/32112* (2013.01); *H04N 1/32133* (2013.01); *H04N 5/765* (2013.01); *H04N 2201/0036* (2013.01); *H04N 2201/0039* (2013.01); *H04N 2201/0055* (2013.01); *H04N 2201/0094* (2013.01); *H04N 2201/0096* (2013.01); *H04N 2201/3205* (2013.01); *H04N 2201/3214* (2013.01); *H04N 2201/3215* (2013.01); *H04N 2201/3226* (2013.01); *H04N 2201/3245* (2013.01); *H04N 2201/3253* (2013.01); *H04N 2201/3264* (2013.01); *H04N 2201/3266* (2013.01); *H04N 2201/3269* (2013.01); *H04N 2201/3271* (2013.01); *H04N 2201/3273* (2013.01)

(56) References Cited

U.S. PATENT DOCUMENTS

| | | | |
|---|---|---|---|
| 2004/0240919 A1* | 12/2004 | Hisatomi | H04N 1/00291 400/76 |
| 2004/0249650 A1* | 12/2004 | Freedman | G06Q 30/02 705/7.29 |
| 2005/0068571 A1* | 3/2005 | Hart | H04N 1/00281 358/1.15 |
| 2008/0010079 A1* | 1/2008 | Genda | H04N 1/00326 358/1.15 |
| 2008/0144053 A1* | 6/2008 | Gudan | B41J 3/36 358/1.8 |
| 2009/0122157 A1 | 5/2009 | Kuboyama et al. | |
| 2010/0023851 A1 | 1/2010 | Schormann | |
| 2012/0262741 A1* | 10/2012 | Naruse | H04N 1/60 358/1.9 |
| 2013/0054636 A1 | 2/2013 | Tang | |
| 2013/0307842 A1* | 11/2013 | Grinberg | G06F 3/1431 345/419 |
| 2014/0258334 A1 | 9/2014 | Mukasa | |
| 2015/0019659 A1 | 1/2015 | Eidelson et al. | |
| 2015/0339282 A1 | 11/2015 | Goyal | |
| 2016/0011825 A1* | 1/2016 | Ito | G06F 3/1242 358/1.18 |
| 2016/0119388 A1 | 4/2016 | Sitrick et al. | |

\* cited by examiner

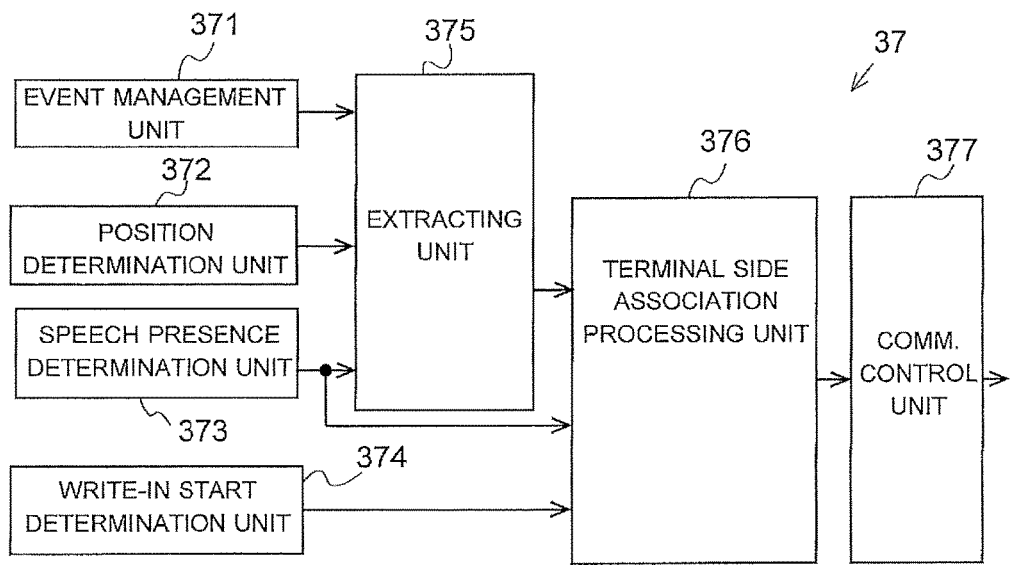
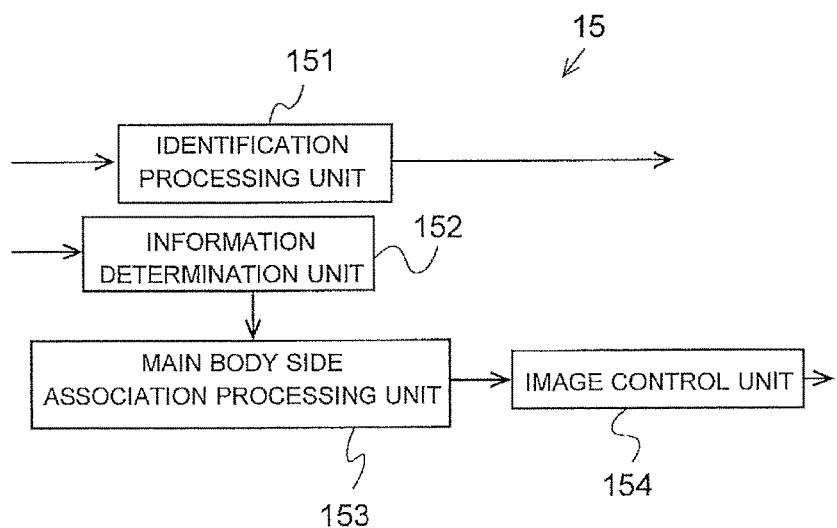

Fig. 18
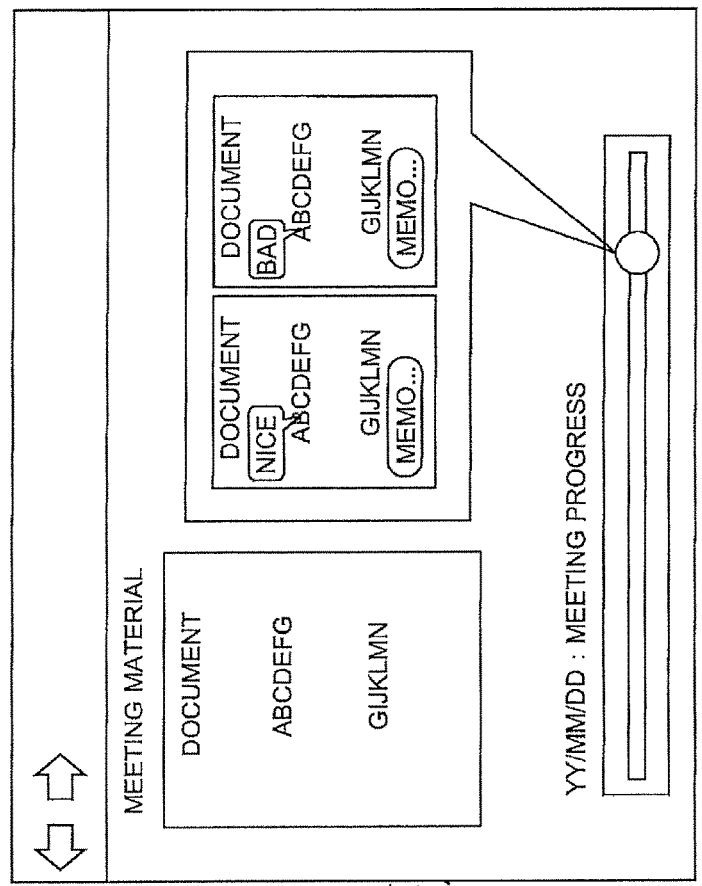
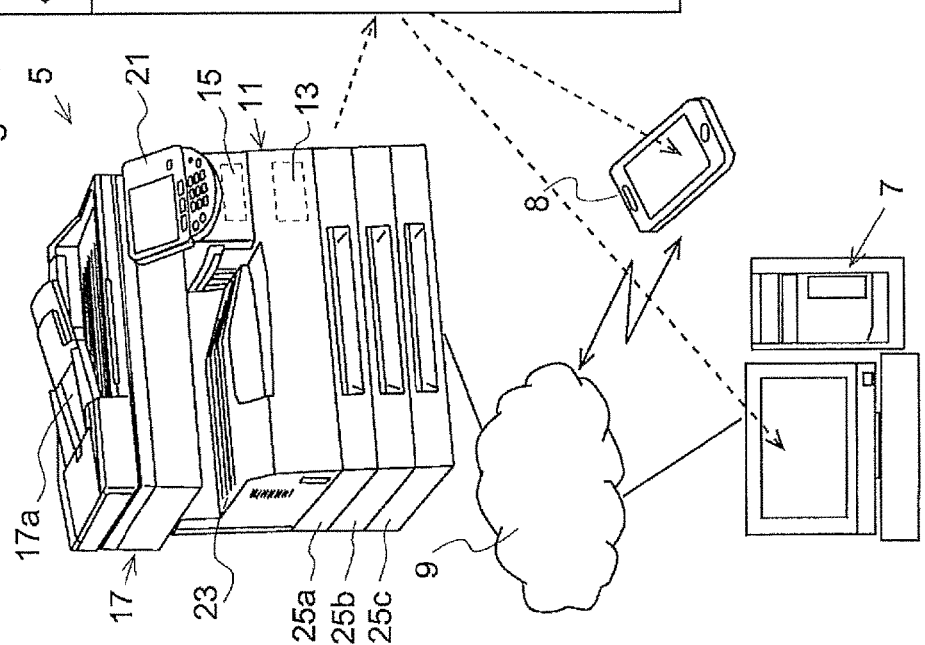

INFORMATION PROCESSING SYSTEM, ELECTRONIC APPARATUS, INFORMATION PROCESSING APPARATUS, INFORMATION PROCESSING METHOD, ELECTRONIC APPARATUS PROCESSING METHOD AND NON-TRANSITORY COMPUTER READABLE MEDIUM TO CONFIRM DIFFERENCE IN MEETING CONTENTS USING SOUND INFORMATION

CROSS-REFERENCE TO RELATED APPLICATIONS

The present application claims priority under 35 U.S.C. § 119 to Japanese Patent Application No. 2016-116342, filed Jun. 10, 2016. The contents of this application are herein incorporated by reference in their entirety.

BACKGROUND

One or more embodiments of the present invention relate to an information processing system, an electronic apparatus, an information processing apparatus, an information processing method, an electronic apparatus processing method and a non-transitory computer readable medium.

DESCRIPTION OF RELATED ART

During a meeting, participants add and correct a meeting material containing text and the like printed for use in offices. Because of this, the material to be recorded is a result containing added and corrected matters. However, information to be collected does not include information as to with which timing these revisions were made.

Accordingly, since there is no information for remembering what is aimed at by additional matters such as added and corrected matters, the reason why such additional matters are added may not be grasped.

Incidentally, as a technique to record additional matters added during a meeting in comparison with a meeting material, it is proposed, for example, in Japanese Patent Published Application No. 2015-208047 to store a meeting material displayed on a tablet terminal in association with a meeting material imaged with an imaging unit that is installed in the tablet terminal.

In accordance with the prior art technique described in Japanese Patent Published Application No. 2015-208047, a meeting material and additional matters to this meeting material are associated with each other. However, it still remains unknown with which timing the additional matters are added to the meeting material.

Meanwhile, an additional matter is often written in a meeting material with the timing when a participant speaks content of a discussion. Accordingly, in many cases, it cannot be confirmed by examining voice information of a meeting what is meant by additional matters to a meeting material, i.e., differential information between the meeting material before the meeting and the meeting material after or during the meeting.

However, in the case of the prior art technique described in Japanese Patent Published Application No. 2015-208047, it is impossible to confirm the meanings of differential information of content of a meeting with reference to sound information.

SUMMARY

One or more embodiments of the present invention provide an information processing system, an electronic apparatus, an information processing apparatus, an information processing method, an electronic apparatus processing method and a non-transitory computer readable medium that confirm the meanings of difference information in meeting content with reference to the sound information.

In one or more embodiments, an information processing system comprises an electronic apparatus and an information processing apparatus that exchanges various information with the electronic apparatus. The electronic apparatus comprises: an imaging unit; an extracting unit that extracts, at each detection cycle based on taken image information of a paper medium taken by the imaging unit, a difference between meeting content contained in the taken image information and meeting content contained in master information saved in the information processing apparatus; a sound recording unit that records a surrounding sound while a meeting is being held with respect to the meeting content contained in the master information; and a terminal side association processing unit that associates difference information of the difference with sound information of the sound recorded by the sound recording unit with the timing when the difference is detected in correspondence with the extraction of the difference, and the information processing apparatus comprises: a main body side association processing unit that associates the master information with pair information consisting of the difference information and the sound information that are associated with each other by the terminal side association processing unit.

In one or more embodiments, the information processing apparatus further comprises: a storage unit that stores the master information and the attribute information of the master information; an identification processing unit that generates identification image information from the attribute information of the master information stored in the storing unit; and an image processing unit that forms a print image on the paper medium based on meeting material image information generated from the meeting content contained in the master information and the identification image information generated by the identification processing unit, wherein the image processing unit forms, as the print image, a meeting material image based on the meeting material image information and an identification image based on the identification image information, and wherein the identification image information includes storage destination information of the master information, which is an item of the attribute information of the master information.

In one or more embodiments, the information processing apparatus further comprises: an image control unit that controls an interface image with which is freely output any one from any other of the master information, the attribute information of the master information, the difference information and the sound information, wherein the interface image serves as an interface to freely output the sound information based on the difference information, wherein the attribute information of the master information includes identification information for identifying the meeting content contained in the master information, host information about a host of the meeting, or output person information about an output person who commands formation of the print image on the paper medium in addition to the storage destination information of the master information.

In one or more embodiments, the electronic apparatus further comprises: an event management unit that manages the differences extracted by the extracting unit in units of events, wherein the extracting unit extracts the sound information in correspondence with the event managed by the event management unit, wherein the event serves as an indicator showing a change in the taken image information in the progress of the meeting, starts when the difference is extracted, and terminates if no difference is extracted anew for a temporal waiting period, and wherein the terminal side association processing unit associates the sound information with the difference information for each event.

In one or more embodiments, the terminal side association processing unit has a period for clipping the sound information include a preceding period before starting the event and a succeeding period after terminating the event.

In one or more embodiments, if a short waiting time is not exceeded by a difference extraction interval at which the differences are extracted, the extracting unit extracts the differences with reference to the same master information.

In one or more embodiments, if the position of the electronic apparatus does not exceed a set movement range, the extracting unit extracts the difference based on the same master information.

In one or more embodiments, the detection cycle, the temporal waiting period or the sound information clipping period can freely be changed.

In one or more embodiments, the short waiting time or the set movement range can freely be changed.

In one or more embodiments, the short waiting time is not exceeded by the difference extraction interval, or if the position of the electronic apparatus does not exceed the set movement range, the detection cycle, the temporal waiting period, the sound information clipping period, the short waiting time or the set movement range can freely and dynamically be changed within a change allowable range in accordance with the number of sheets contained in the paper medium on which the print image is formed.

In one or more embodiments, if the difference disappears while the meeting is being held, the terminal side association processing unit dissolves the association between the difference information and the sound information.

In one or more embodiments, if the short waiting time is not exceeded by the difference extraction interval at which differences are extracted, or if the set movement range is not exceeded by the position of the electronic apparatus and differences are extracted, the terminal side association processing unit sets the preceding period before starting the event to an extended preceding period.

In one or more embodiments, a speech recognition unit that recognizes a speech is further provided, wherein if a silent state is continued after the event occurs, the terminal side association processing unit starts extracting the sound information with the timing when the speech recognition unit recognizes a speech.

In one or more embodiments, a character recognition that recognizes characters is further provided, wherein when the character recognition unit detects start of writing characters to the paper medium, and the speech recognition unit detects a speech to be recognized, the terminal side association processing unit associates the sound information and characters written to the paper medium with each other in preference to the timing with which a difference is extracted in the detection cycle.

In one or more embodiments, the pair information is associated with the master information for each output person information.

In one or more embodiments, the interface image includes an image showing the progress state of the meeting, wherein the image control unit associates the image showing the progress state of the meeting with the sound information and the difference information.

In one or more embodiments, the electronic apparatus further comprises a communication control unit that acquires the master information, which is used to extract differences with the extracting unit, based on the storage destination information of the master information, wherein the information processing apparatus further comprises an information determination unit that determines whether or not the pair information is transmitted, wherein when the communication control unit does not establish communication with the information processing apparatus, pair information is saved so that, when the communication is established, the communication control unit transmits the pair information to the information processing apparatus, and wherein when the information determination unit determines that the pair information is transmitted, the main body side association processing unit associates the pair information with the master information.

BRIEF DESCRIPTION OF THE DRAWINGS

FIG. 4 is a view showing an example of a functional configuration of a control unit 37 of the electronic apparatus 3 in accordance with one or more embodiments of the present invention.

FIG. 5 is a view showing an example of a functional configuration of a control unit 15 of the information processing apparatus 5 in accordance with one or more embodiments of the present invention.

FIG. 18 is a schematic diagram for showing an example of a GUI in which the master information, difference information and sound information are associated with each other in accordance with one or more embodiments of the present invention.

DETAILED DESCRIPTION

In what follows, one or more embodiments of the present invention will be explained with reference to the drawings. However, the present invention is not limited to the following embodiments.

Figure 1:
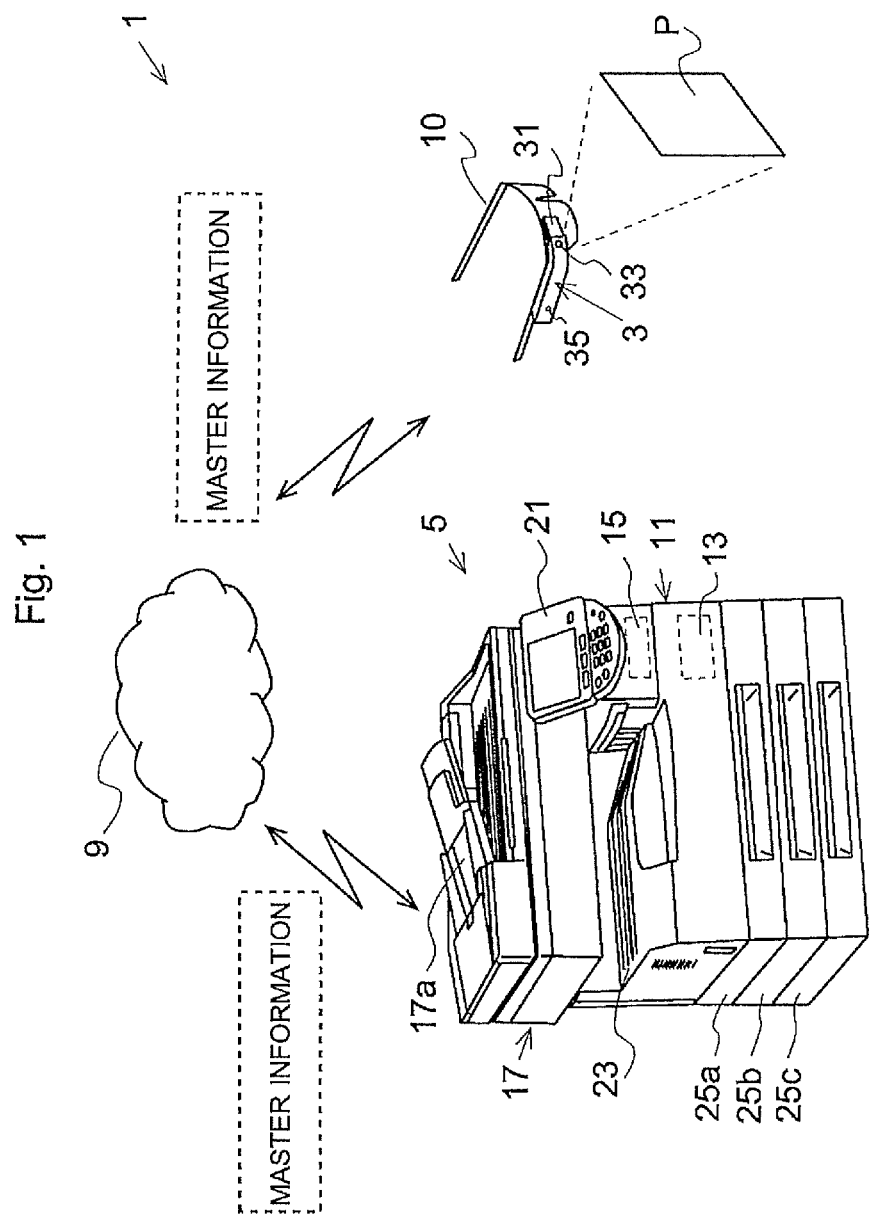
FIG. 1 is a schematic diagram for showing the overall configuration of an information processing system 1 in accordance with one or more embodiments of the present invention.

FIG. 1 is a schematic diagram for showing the overall configuration of an information processing system 1 in accordance with one or more embodiments of the present invention. As illustrated in FIG. 1, the information processing system 1 consists of an electronic apparatus 3 and an information processing apparatus 5, which are connected through a network 9. The electronic apparatus 3 and the information processing apparatus 5 can exchange information through the network 9. The electronic apparatus 3 is attached to a pair of eyeglasses 10 (referred to herein for simplicity also as eyeglasses) to make it possible to use the eyeglasses 10 as smart eyeglasses. Although described below in detail, the information processing apparatus 5 is not only used as an MFP (Multi-Functional Peripheral) but also capable of exchanging master information as an item of the various information with the electronic apparatus 3 through the network 9.

Also, although described below in detail, the information processing system 1 is configured such that the electronic apparatus 3 and the information processing apparatus 5 are cooperated to make it possible to confirm, from speech content during a meeting, the meaning of additional matters added in handwritten or the like to a paper medium P, which is used as a meeting material during the meeting.

The electronic apparatus 3 is provided with a display unit 31, an imaging unit 33, a sound recording unit 35 and so forth. The display unit 31 displays various images to a user through the eyeglasses 10. Namely, the display unit 31 displays information acquired through the network 9 in the form of images. The imaging unit 33 includes, for example, an image sensor such as a CCD or a CMOS to acquire a still image or a motion picture by imaging a subject. The sound recording unit 35 records surrounding sounds. The electronic apparatus 3 can acquire an image formed on a paper medium P, perform various processes with the acquired image, and transmit the execution results of the various processes to the information processing apparatus 5. Incidentally, the display unit 31 may display an image in a position apart from the eyeglasses 10 with a prism or the like. Also, the electronic apparatus 3 is provided with an operation unit, which is not shown in the figure.

The information processing apparatus 5 is provided with a printer unit 11, a power supply unit 13, a control unit 15, an image reading unit 17, an operation display unit 21, a catch tray 23, a paper feed cassettes 25a to 25c and the like. The printer unit 11, the power supply unit 13 and the control unit 15 are installed inside of a housing of the information processing apparatus 5.

Each of the paper feed cassettes 25a to 25c is arranged such that it can be withdrawn from the housing of the information processing apparatus 5. The paper feed cassette 25a, the paper feed cassette 25b and the paper feed cassette 25c are collectively referred to simply as the paper feed cassette 25 when they need not be distinguished. The paper feed cassette 25a, the paper feed cassette 25b and the paper feed cassette 25c accommodate paper mediums P having different sizes respectively. The paper medium P accommodated by the paper feed cassette 25 is transmitted to the printer unit 11 one by one when printing. Incidentally, while there are three paper feed cassettes 25 in the above example, the present invention is not limited thereto.

In the housing of the information processing apparatus 5, the catch tray 23 is located above a portion in which the printer unit 11 is installed and below a portion in which the image reading unit 17 is installed. A paper medium P on which an image is formed by the printer unit 11 is discharged to the catch tray 23 from the inside of the housing.

The operation display unit 21 is located in an upper position of the information processing apparatus 5, and arranged in a front side where the paper feed cassette 25 can be withdrawn from the housing. The operation display unit 21 accepts an operation of a user, and is capable of displaying at least one of the results of the operation accepted of the user and the internal state of the information processing apparatus 5.

Although described below in detail, the printer unit 11 makes use of an electrophotographic process technique to form an image on a paper medium P accommodated by the paper feed cassette 25 or a manual insertion tray, which is not shown in the figure. The printer unit 11 is capable of combining four colors or five colors including a particular color by a tandem system to form a color image on a paper medium P.

The image reading unit 17 is located at the top of the information processing apparatus 5. The image reading unit 17 is provided with an automatic document feeder 17a. The image reading unit 17 successively receives originals placed on an original tray and transmitted by the automatic document feeder 17a, and reads the image of the original as analog image data.

Figure 2:
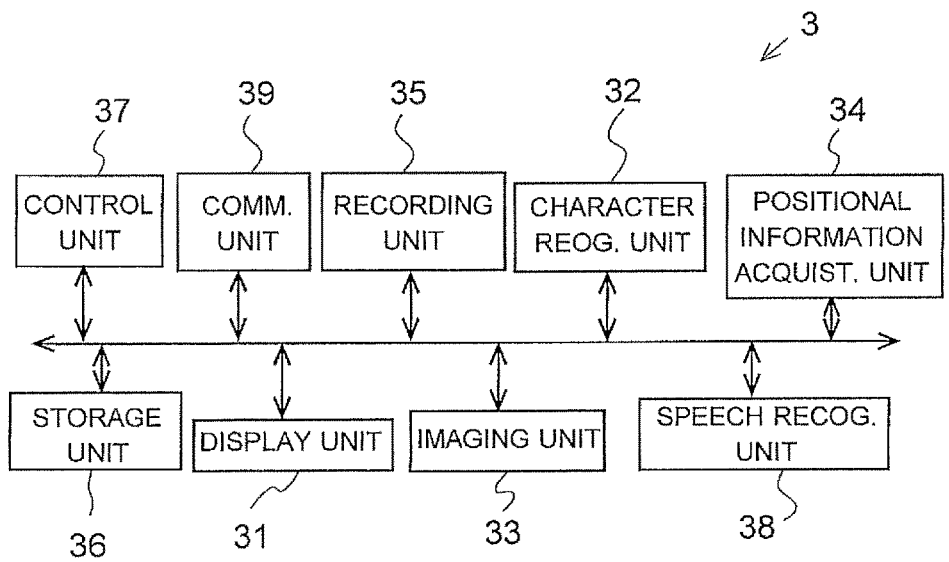
FIG. 2 is a view for showing an example of the configuration of an electronic apparatus 3 in accordance with one or more embodiments of the present invention.

FIG. 2 is a view for showing an example of the configuration of the electronic apparatus 3 in accordance with the one or more embodiments of the present invention. As shown in FIG. 2, the electronic apparatus 3 is provided with a character recognition unit 32, a positional information acquisition unit 34, a storage unit 36, a control unit 37, a speech recognition unit 38 and a communication unit 39 in addition to the display unit 31, the imaging unit 33 and the sound recording unit 35 as described above. The communication unit 39 transmits and receives various signals.

The character recognition unit 32 recognizes characters. Specifically, the character recognition unit 32 can recognize characters, for example, by operating a character recognition function such as an optical character recognition function. The character recognition unit 32 identifies a character area based on image information of a paper medium P, which is imaged by the imaging unit 33. The character recognition unit 32 then recognizes characters in the identified character area. Incidentally, the character recognition unit 32 is not necessarily implemented within the electronic apparatus 3.

The positional information acquisition unit 34 identifies the position of the electronic apparatus 3 by a GPS function. The storage unit 36 includes a nonvolatile memory such as a flash memory. The storage unit 36 is used to store a program for taking images with the imaging unit 33, a program for recording sound with the sound recording unit 35 and the like.

The storage unit 36 is used to store also various data in addition to the above programs. For example, the storage unit 36 stores image data of taken image information of a paper medium P, which is imaged by the imaging unit 33. Furthermore, the storage unit 36 stores sound recording data of sound information of surrounding sounds, which is recorded by the sound recording unit 35. Still further, the storage unit 36 stores various image data or document data acquired through the communication unit 39.

The speech recognition unit 38 recognizes voices. Namely, the speech recognition unit 38 can recognize voices, for example, by operating a speech recognition function. For example, the speech recognition unit 38 makes use of a piezoelectric device to recognize voices. Incidentally, the speech recognition unit 38 is not necessarily installed within the electronic apparatus 3.

The control unit 37 includes a CPU, a ROM, a RAM and an I/O interface, are not shown in the figure. The CPU of the control unit 37 reads various programs from the ROM or the storage unit 36 in accordance with required processes, loads the programs on the RAM, and executes the loaded programs, which cooperate with the control unit 37 and control the operation of each element of the electronic apparatus 3.

Figure 3:
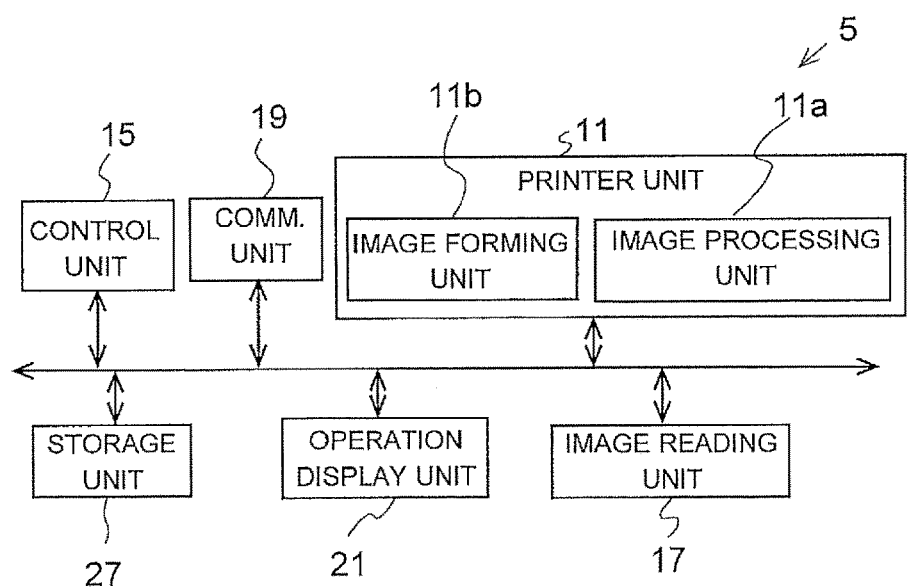
FIG. 3 is a view for showing an example of the configuration of an information processing apparatus 5 in accordance with one or more embodiments of the present invention.

FIG. 3 is a view for showing an example of the configuration of the information processing apparatus 5 in accordance with the one or more embodiments of the present invention. As shown in FIG. 3, the information processing apparatus 5 is provided with a storage unit 27 and a communication unit 19 in addition to the printer unit 11, the control unit 15, the image reading unit 17 and the operation display unit 21 as described above.

The printer unit 11 is provided with an image processing unit 11a and an image forming unit 11b. The image processing unit 11a is provided with an arithmetic unit such as a CPU or an integrated circuit such as an ASIC and capable of performing various processes.

For example, the image processing unit 11a performs various processes with analog image data read by the image sensor, which is not shown in the figure, of the image reading unit 17. Specifically, the analog image data is converted to digital image data including RGB codes by performing an analog process, A/D conversion, shading compensation, an image compression process, a variable magnification process and so forth. The image processing unit 11a converts the digital image data including RGB codes to image data corresponding to color Y (yellow), color M (Magenta), color C (cyan) and color K (black), and transmits conversion results to the image forming unit 11b.

The image forming unit 11b forms a color image based on the image data transmitted from the image processing unit 11a. The image forming unit 11b is provided with an image forming unit for each color, an intermediate transfer unit and a fixing unit. The image forming unit charges the peripheral surface of a photoreceptor drum with a charging unit, forms an electrostatic latent image by radiating light to the photoreceptor drum with a writing unit, and forms a toner image by visualizing the electrostatic latent image of the photoreceptor drum with a developing unit. The intermediate transfer unit transfers the toner image of the photoreceptor drum to an intermediate transfer belt successively for each color, and transfers the transferred toner image to a sheet. The fixing unit fixes the toner image transferred from the intermediate transfer unit.

The operation display unit 21 is provided with a button for accepting user operations, and a display screen for displaying proposed operations to the user. The display screen includes a touch panel laminated thereon and serves as a touch panel display. Incidentally, the operation display unit 21 may be provided with a plurality of different color LEDs for the purpose of giving intuitive visual information to a user. Furthermore, the operation display unit 21 may be provided with a speaker for outputting sounds. In this case, the operation display unit 21 can output sounds in accordance with an image displayed on the display screen. Namely, the operation display unit 21 accepts operations and outputs sounds or images.

The communication unit 19 accepts various jobs such as a print job transmitted to the information processing apparatus 5 through the network 9. When performing a function other than those performed by the control unit 15, the communication unit 19 communicates with an external device. The storage unit 27 includes a nonvolatile storage device such as an HDD. The storage unit 27 stores various image data or document data in addition to various control programs. The document data stored in the information processing apparatus 5 is used as master information.

If the document data is a meeting material, the master information is information containing meeting content. The master information is used when a printing image is formed on a paper medium P by the printer unit 11. The master information contains, for example, text information. The text information contains characters, a style of writing each character, a position in which each character is to be printed, and so forth. Accordingly, by acquiring the master information from the information processing apparatus 5, the electronic apparatus 3 can acquire print content of print images to be formed on a paper medium P used as a meeting material.

Incidentally, the master information that the electronic apparatus 3 acquires from the information processing apparatus 5 is not necessarily transferred from the information processing apparatus 5 to the electronic apparatus 3, but can be a copy of the master information. Also, when comparing meeting content contained in the master information with taken image information of a paper medium P, which is imaged by the imaging unit 33 of the electronic apparatus 3, the information processing apparatus 5 saves the master information.

Specifically, in one or more embodiments, the control unit 15 includes mainly a CPU, a ROM and an I/O interface. The CPU of the control unit 15 reads various programs from the ROM or the storage unit 27 in accordance with required processes, loads the programs on the RAM, and executes the loaded programs, which cooperate with the control unit 15 and control the operation of each element of the information processing apparatus 5.

FIG. 4 is a view showing an example of a functional configuration of the control unit 37 of the electronic apparatus 3 in accordance with the one or more embodiments of the present invention. The control unit 37 is responsible for controlling the operation of the electronic apparatus 3 and implemented with a microcomputer, includes mainly the CPU, the ROM, the RAM, and the I/O interface which are not shown in the figure. A predetermined control program is run by the control unit 37 to implement various functions such as an event management unit 371, a position determination unit 372, a speech presence determination unit 373, a write-in start determination unit 374, an extracting unit 375, a terminal side association processing unit 376, a communication control unit 377 and the like as illustrated in FIG. 4.

FIG. 5 is a view showing an example of a functional configuration of the control unit 15 of the information processing apparatus 5 in accordance with one or more embodiments of the present invention. The control unit 15 is responsible for controlling the operation of the information processing apparatus 5 and implemented with a microcomputer, which includes mainly the CPU, the ROM, the RAM, and the I/O interface, which are not shown in the figure. A predetermined control program is run by the control unit 15 to implement various functions such as an identification processing unit 151, an information determination unit 152, a main body side association processing unit 153, an image control unit 154 and the like as illustrated in FIG. 5.

Next, the above various functions will specifically be explained. The extracting unit 375 extracts the differences between the meeting content contained in the taken image information and the meeting content contained in the master information saved in the information processing apparatus 5 at each detection cycle based on the taken image information of the paper medium P taken by the imaging unit 33. The sound recording unit 35 records surrounding sounds while a meeting is being held in relation to the meeting content contained in the master information.

The terminal side association processing unit 376 associates the differences between the meeting content contained in the taken image information and the meeting content contained in the master information saved in the information processing apparatus 5 with the sound information of sounds recorded by the sound recording unit 35 with the timing when the difference information of the differences are detected. The main body side association processing unit 153 associates the master information with pair information that include the difference information and the sound information, which are associated with each other by the terminal side association processing unit 376.

The storage unit 27 stores the master information and the attribute information of the master information. The attribute information of the master information includes storage destination information of the master information, identification information for identifying the meeting content contained in the master information, host information about the host of the meeting relating to the meeting content contained in the master information, or output person information about the output person Z who commands formation of an print image on a paper medium P.

The identification processing unit 151 creates identification image information from the attribute information of the master information stored in the storage unit 27. The identification image information is information about the meeting content contained in the master information, and contains the above storage destination information of the master information. Accordingly, if the storage destination information of the master information is identified by the identification image information, the electronic apparatus 3 can acquire the master information.

The image processing unit 11a forms print images on a paper medium P based on meeting material image information created from the meeting content contained in the master information and identification image information created by the identification processing unit 151. The image processing unit 11a forms, as print images, a meeting material image based on the meeting material image information and an identification image X based on the identification image information.

The identification image information contains date information about the date when a print image is formed on a paper medium P and other information such as an individual ID of a user who is operating the electronic apparatus 3, in addition to the storage destination information of the master information. If the user who is operating the electronic apparatus 3 is the same person as the above output person Z, the output person information is contained in the identification image information. The identification image X includes, for example, a two-dimensional code that can be acquired by imaging it with the imaging unit 33. Accordingly, the imaging unit 33 has a sufficient resolution for reading the two-dimensional code. The two-dimensional code is, for example, a QR code.

The image control unit 154 controls an interface image that is freely output with any one of the master information, the attribute information of the master information, the difference information and the sound information. The interface image is used to freely output the sound information based on the difference information.

Figure 6:
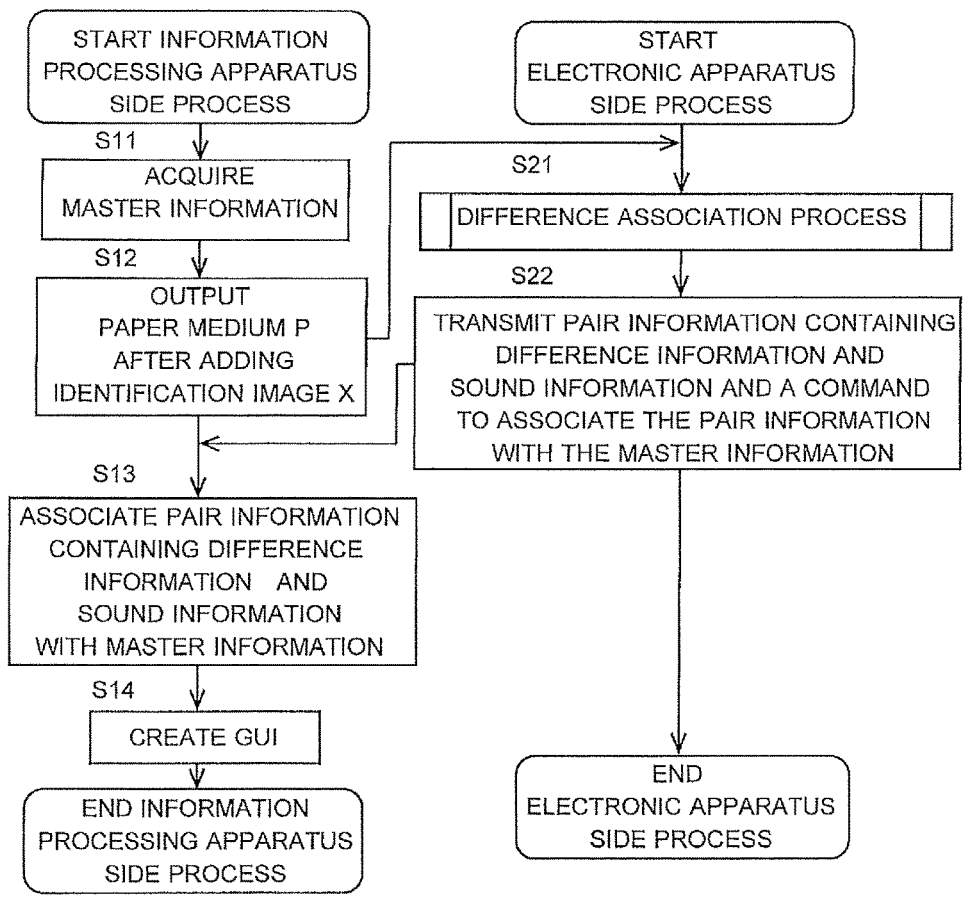
FIG. 6 is a flow chart for explaining a control example in accordance with one or more embodiments of the present invention.

FIG. 6 is a flow chart for explaining a control example in accordance with one or more embodiments of the present invention. In FIG. 6, the electronic apparatus 3 extracts additional matters added to a paper medium P output from the information processing apparatus 5 as differences, and associates and transmits the differences and the sound data recorded when extracting the differences to the information processing apparatus 5. Incidentally, the processes from step S11 to step S14 are performed by the information processing apparatus 5. On the other hand, the processes from step S21 to step S22 are performed by the electronic apparatus 3.

In step S11, the master information is acquired. The master information may be stored in the storage unit 27 or acquired anew through the network 9. In step S12, the meeting content contained in the master information is output to a paper medium P after adding the identification image X thereto. After the process in step S12, step S21 becomes viable.

In step S21, a difference association process is performed. This process will be explained below in detail. In step S22, the pair information containing difference information and sound information and a command to associate the pair information with the master information are transmitted. After transmitting the pair information and the association command from the electronic apparatus 3 to the information processing apparatus 5 in step S22, step S13 becomes viable.

In step S13, the pair information containing the difference information and the sound information is associated with the master information. In step S14, a GUI is created. Namely, the above interface image is output in this step S14.

Figure 7:
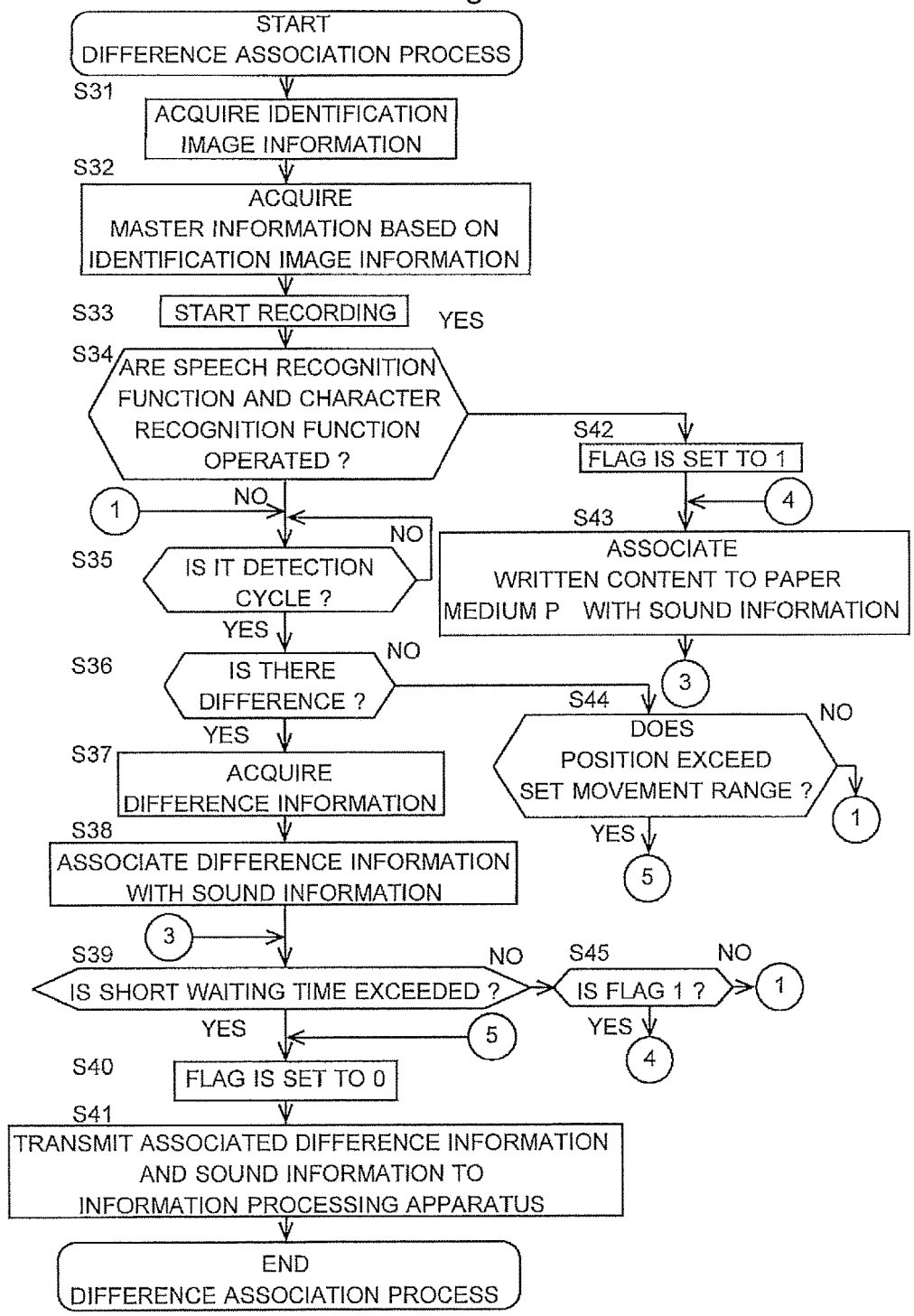
FIG. 7 is a flow chart for explaining a difference association process in accordance with one or more embodiments of the present invention.
Figure 8:
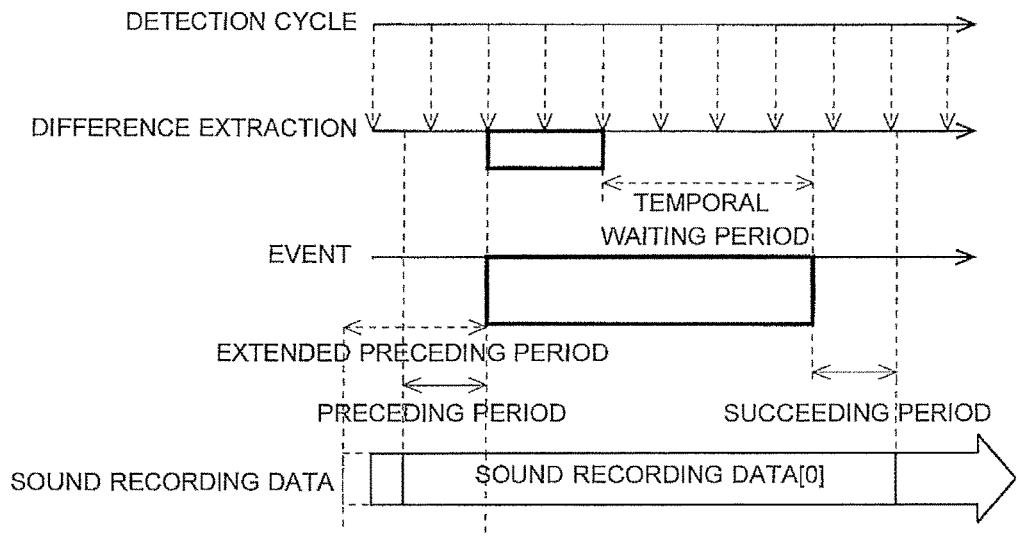
FIG. 8 is a schematic diagram for showing an example that an event is determined a temporal waiting period after a difference is extracted in accordance with one or more embodiments of the present invention.
Figure 9:
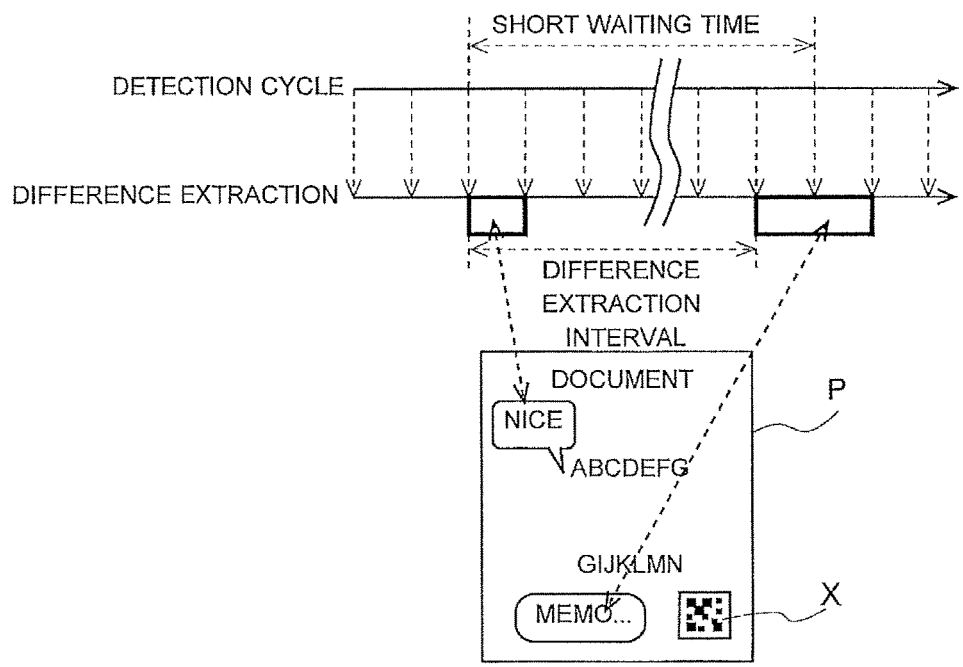
FIG. 9 is a schematic diagram for showing an example that a short waiting time is not exceeded by an interval at which a difference is extracted in accordance with one or more embodiments of the present invention.
Figure 10:
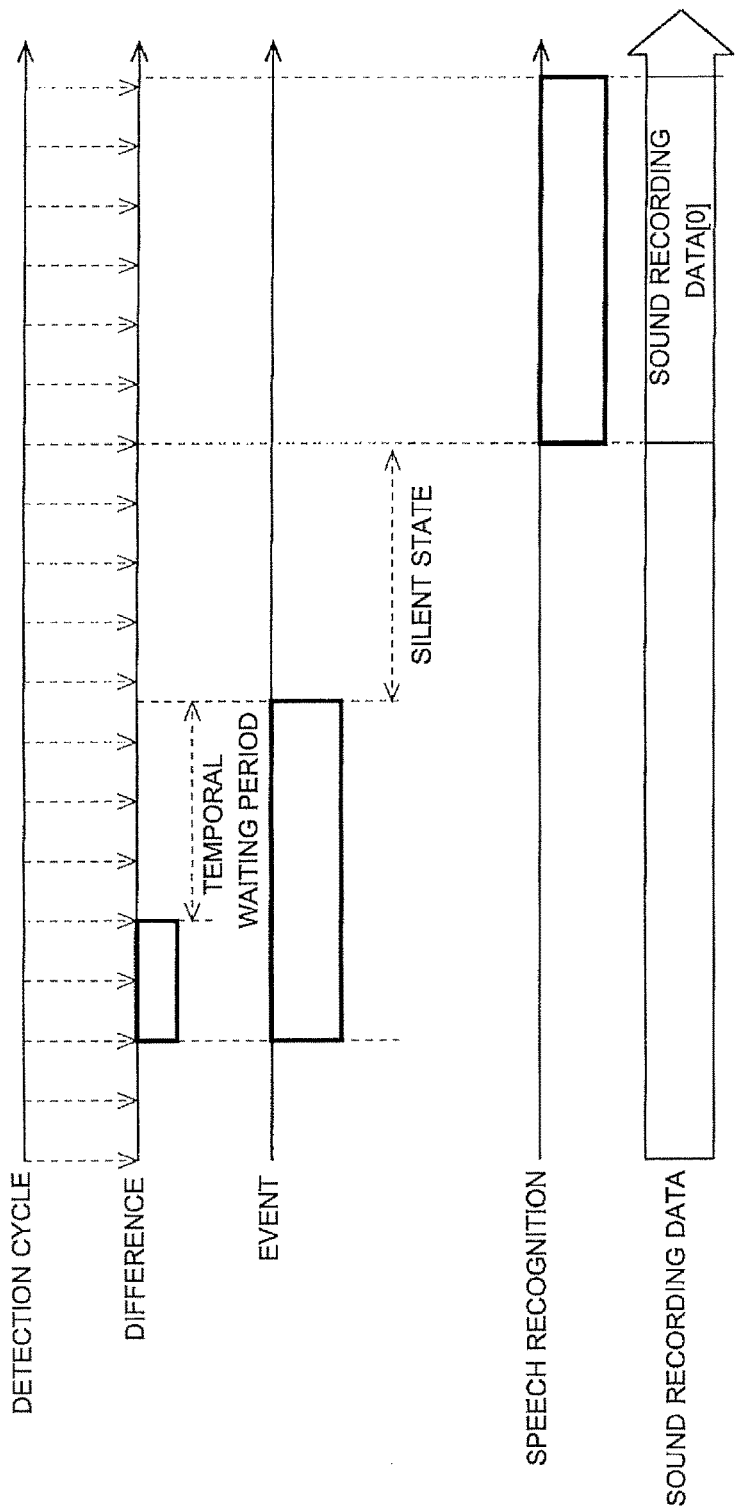
FIG. 10 is a schematic diagram for showing an example of a speech timing in accordance with one or more embodiments of the present invention.

FIG. 7 is a flow chart for explaining the difference association process in accordance with one or more embodiments of the present invention. FIG. 8 is a schematic diagram for showing an example that an event is determined a temporal waiting period after the difference is extracted in accordance with the one or more embodiments of the present invention. FIG. 9 is a schematic diagram for showing an example that a short waiting time is not exceeded by an interval at which the difference is extracted in accordance with one or more embodiments of the present invention. FIG. 10 is a schematic diagram for showing an example of a speech timing in accordance with one or more embodiments of the present invention.

In FIG. 7, a process of extracting differences at each detection cycle, a process of associating the extracted differences with sounds, or a process of associating sounds with characters when these sounds and characters are recognized, is performed.

In step S31, identification image information is acquired. The identification image information is contained in the taken image information that is generated when the imaging unit 33 takes an identification image X. Namely, the identification image information is extracted from the taken image information in correspondence with the identification image X.

In step S32, the master information is acquired based on the identification image information. The identification image information contains the storage destination information of the master information as attribute information of the master information. Accordingly, after extracting the storage destination information of the master information from the identification image information, the electronic apparatus 3 can acquire the master information through the network 9. The master information acquired through the network 9 is used as base data for determining whether or not there occurs a difference accompanying the progress of a meeting.

In step S33, sound recording is started by the sound recording unit 35. This sound recording may be manually started or automatically started with a timer or the like when the meeting begins.

In step S34, it is determined whether or not the speech recognition function and the character recognition function are operated. If it is determined that the speech recognition function and the character recognition function are operated, the process proceeds to step S42. Conversely, if it is determined that the speech recognition function and the character recognition function are not operated, the process proceeds to step S35.

In step S35, it is determined whether or not it is a detection cycle. If it is determined that it is a detection cycle, the process proceeds to step S36. Conversely, if it is determined that it is not a detection cycle, step S35 is repeated.

In step S36, it is determined whether or not there is a difference. If it is determined that there is a difference, the process proceeds to step S37. Conversely, if it is determined that there is no difference, the process proceeds to step S44.

In step S37, difference information is acquired. The difference information is information extracted based on the taken image information. A position where the difference occurs along with an image containing the difference is extracted as the difference information. If the image containing the difference is extracted, an additional matter can be identified.

In step S38, the difference information is associated with sound information. The sound information is sound recording data that is recorded when a difference occurs. Association is performed in a unit of each event. Specifically, as illustrated in FIG. 8, the event management unit 371 manages the differences extracted by the extracting unit 375 in units of events. An event serves as an indicator showing a change in the taken image information in the progress of a meeting, starts when a difference is extracted, and terminates if no difference is extracted anew for a temporal waiting period. Accordingly, the extracting unit 375 extracts sound information in correspondence with an event managed by the event management unit 371. The terminal side association processing unit 376 associates the sound information with the difference information for each event.

More specifically, the terminal side association processing unit 376 has a sound information clipping period include a preceding period before starting an event and a succeeding period after terminating the event. The preceding period before starting an event starts a predetermined time before it is confirmed that a difference is extracted to recognize a change made to an output object as a paper medium P. On the other hand, the succeeding period after terminating the event terminates a predetermined time after the succeeding period in which the output object is not changed. Namely, the sound information clipping period includes a period from a predetermined time before an event to a predetermined time after the event.

In one or more embodiments, the master information, the differential image data between the master information and the taken image information and the date and time information are stored in association with each other.

In step S39, it is determined whether or not a short waiting time is exceeded. The short waiting time is a timely threshold that is used to determine whether or not another meeting is started. If the short waiting time is exceeded, it is recognized that another meeting is started. Specifically, if it is determined that the short waiting time is exceeded, the process proceeds to step S40. Conversely, if it is determined that the short waiting time is not exceeded, the process proceeds to step S45.

That is, if the short waiting time is not exceeded by a difference extraction interval at which differences are extracted as illustrated in FIG. 9, the extracting unit 375 extracts the differences with reference to the same master information.

In step S40, a flag is set to 0. In step S41, the associated difference information and sound information are transmitted to the information processing apparatus 5.

In step S42, the flag is set to 1. In step S43, written content to the paper medium P is associated with the sound information, and the process proceeds to step S39. Specifically, if a silent state is continued after an event occurs as illustrated in FIG. 10, the terminal side association processing unit 376 starts extracting sound information with the timing when the speech recognition unit 38 recognizes a speech. Namely, when the character recognition unit 32 detects start of writing characters to the paper medium P, and the speech recognition unit 38 detects a speech to be recognized, the terminal side association processing unit 376 associates sound information and characters written to the paper medium P with each other in preference to the timing with which a difference is extracted in the detection cycle.

In step S44, it is determined whether or not the position of the electronic apparatus 3 exceeds a set movement range. If it is determined that the position of the electronic apparatus 3 exceeds the set movement range, the process proceeds to step S40. Conversely, if it is determined that the position of the electronic apparatus 3 does not exceed the set movement range, the process proceeds to step S35. Specifically, if the position of the electronic apparatus 3 does not exceed the set movement range, the extracting unit 375 extracts a difference based on the same master information.

In step S45, it is determined whether or not the flag is 1. If it is determined that the flag is 1, the process proceeds to step S43. Conversely, if it is determined that the flag is not 1, the process proceeds to step S35.

In short, a difference is extracted based on the same master information if the first condition that the position of the electronic apparatus 3 is within the set movement range in step S44 or the second condition that the difference extraction interval is within the short waiting time in step S39 is satisfied. In other words, as long as the above first or second condition is satisfied, a plurality of differential image data items and audio data items are stored in association with a single master information and the date and time information corresponding thereto.

Also, as long as the above first or second condition is satisfied, the electronic apparatus 3 need not always capture the identification image X. Furthermore, when a plurality of meeting materials have different identification images X added respectively thereto, and the electronic apparatus 3 captures these identification images X respectively, the set movement range and the short waiting time are dynamically changed in accordance with the number of meeting materials captured by the electronic apparatus 3.

For example, when the electronic apparatus 3 discontinuously captures the identification image X while, in the situation that no difference is extracted after a difference is lastly extracted, it is detected that a difference is extracted in the next detection cycle, sound recording data is clipped and saved by tracking back for a longer time than in usual cases. Namely, the preceding period shown in FIG. 8 is extended as an extended preceding period so that the start time of clipping sound recording data is set to an earlier time.

Specifically, if the short waiting time is not exceeded by a difference extraction interval at which differences are extracted, or if the position of the electronic apparatus 3 does not exceed the set movement range and differences are extracted, the terminal side association processing unit 376 sets the preceding period before starting an event to the extended preceding period. Incidentally, the extended preceding period can appropriately be changed in accordance with the condition of a meeting, the amount of a meeting material and so forth.

Also, the detection cycle, the temporal waiting period or the sound information clipping period can freely be changed. Furthermore, the short waiting time or the set movement range can freely be changed. In other words, if the short waiting time is not exceeded by the difference extraction interval, or if the position of the electronic apparatus 3 does not exceed the set movement range, these parameters can freely and dynamically be changed within a change allowable range in accordance with the number of sheets contained in the paper medium P on which print images are formed. The change allowable range may be set in accordance with a necessary time and movement range for discontinuously capturing the identification image X.

Incidentally, if a difference disappears while a meeting is being held, the association between this difference and sounds is dissolved. For example, this occurs when an additional matter that has been added is deleted during a meeting.

When the above first or second condition becomes no longer satisfied, the differential image data in periods before and after changes of the master information, the sound recording data recorded when the changes are made, and the relevant date and time data are transmitted to the information processing apparatus 5, i.e., the storage destination through the network 9.

Incidentally, when the electronic apparatus 3 is not connected to the network 9, the electronic apparatus 3 temporarily stores pair information in the storage unit 36, and the pair information is transmitted to the information processing apparatus 5 through the network 9 as soon as the electronic apparatus 3 is connected to the network 9. Specifically, based on the storage destination information of the master information, the communication control unit 377 of the electronic apparatus 3 acquires the master information that is used to extract differences with the extracting unit 375. On the other hand, the information determination unit 152 of the information processing apparatus 5 determines whether or not pair information is transmitted.

More specifically, when the communication control unit 377 does not establish communication with the information processing apparatus 5, pair information is saved so that, when the communication is established, the communication control unit 377 transmits the pair information to the information processing apparatus 5. On the other hand, when the information determination unit 152 determines that pair information is transmitted, and the main body side association processing unit 153 associates the pair information with the master information.

Figure 11:
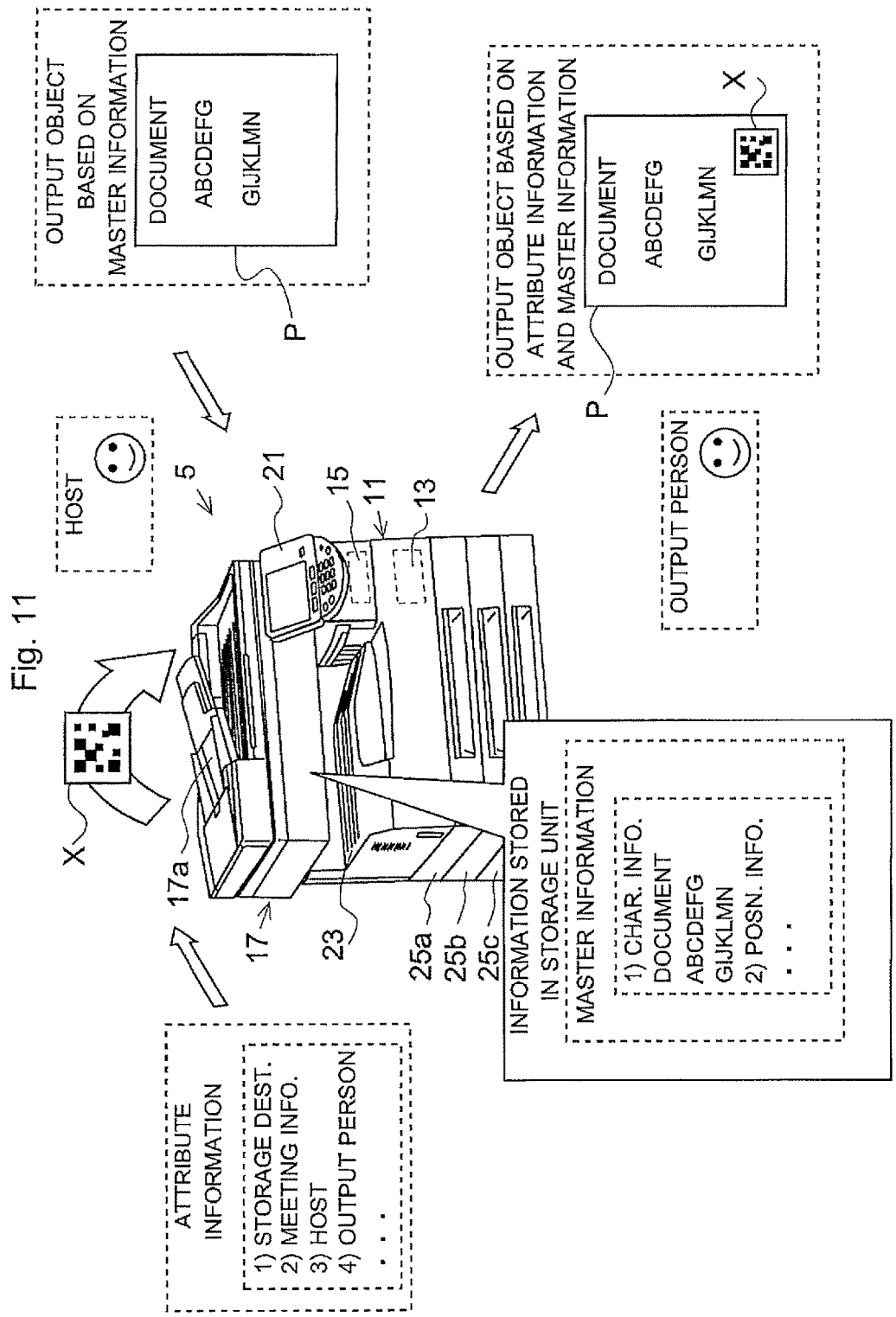
FIG. 11 is a schematic diagram for showing an example of outputting a two-dimensional code in accordance with one or more embodiments of the present invention.

Next, the process of associating difference information, sound information and an output person Z with each other will be conceptually explained with reference to FIG. 11 through FIG. 13. FIG. 11 is a schematic diagram for showing an example of outputting a two-dimensional code in accordance with one or more embodiments of the present invention. As illustrated in FIG. 11, an output object is output as a paper medium P with an identification image X based on the master information that is stored in the storage unit 27 and the identification image X that is formed from the attribute information of the master information.

Figure 12:
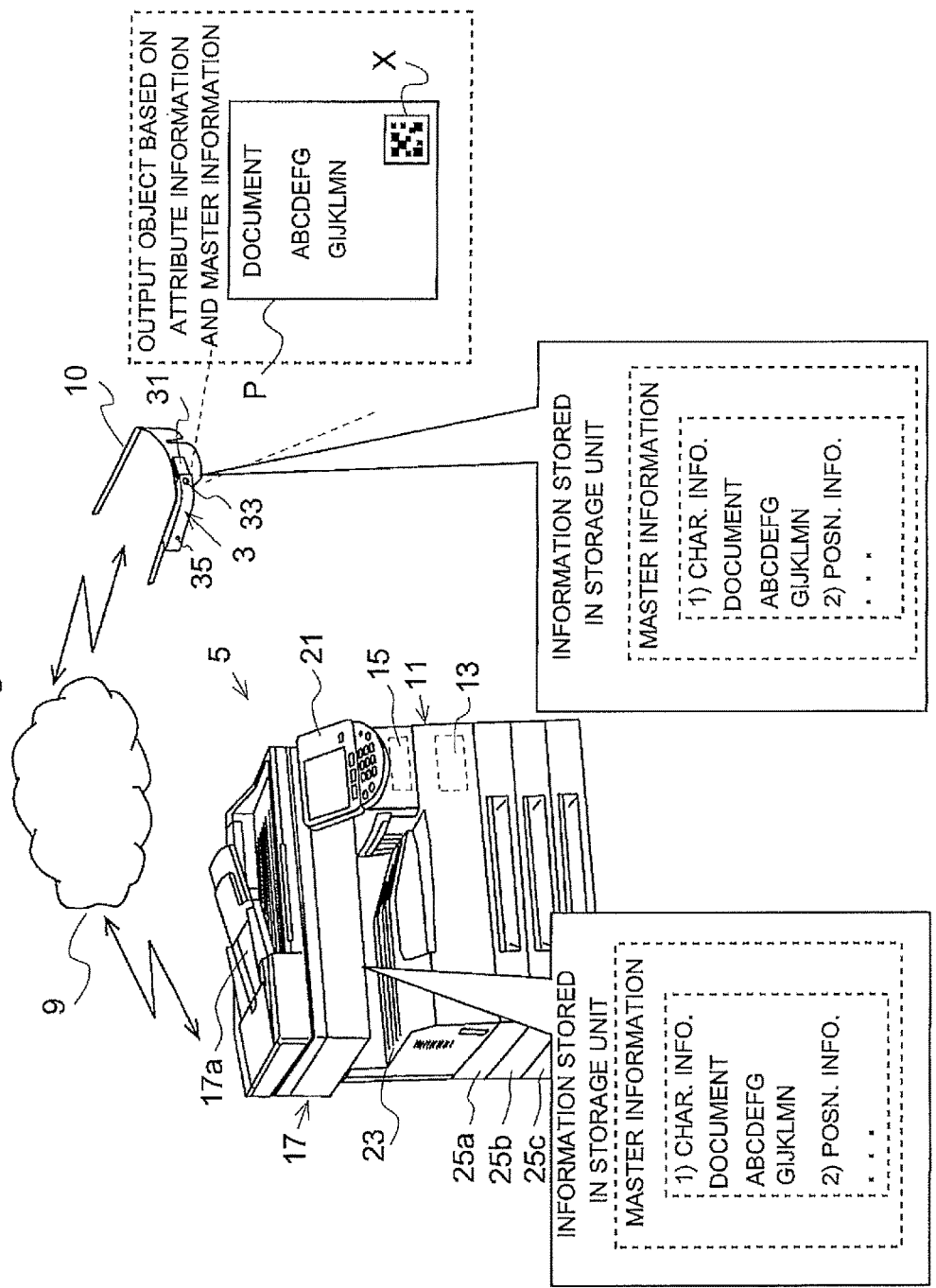
FIG. 12 is a schematic diagram for showing an example of acquiring master information in accordance with one or more embodiments of the present invention.

FIG. 12 is a schematic diagram for showing an example of acquiring the master information in accordance with one or more embodiments of the present invention. As illustrated in FIG. 12, based on the attribute information contained in the identification image X, the electronic apparatus 3 stores the master information held by the storage unit 27 of the information processing apparatus 5 in the storage unit 36.

Figure 13:
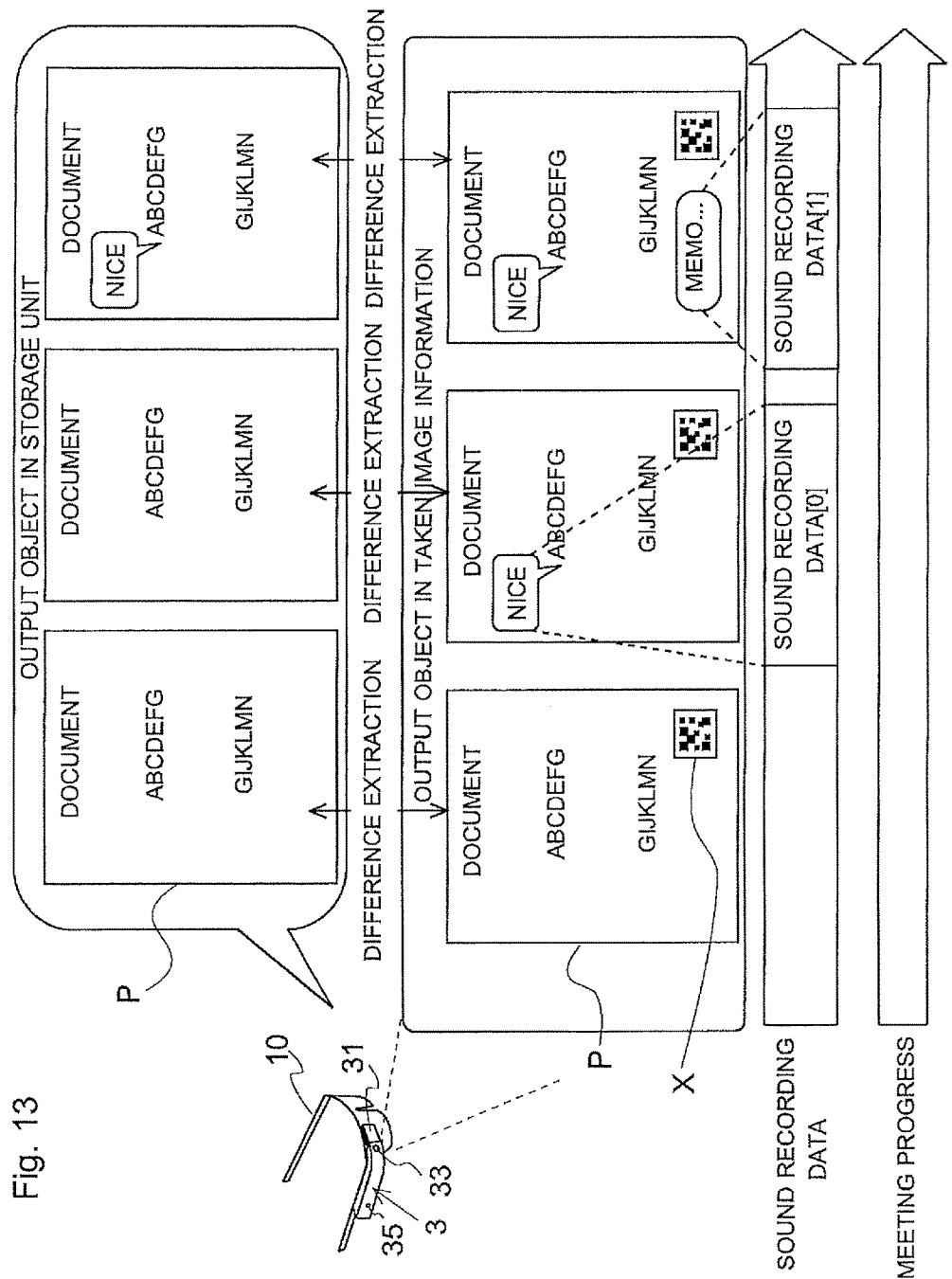
FIG. 13 is a schematic diagram for showing an example of recording sounds and adding difference information in the progress of a meeting in accordance with one or more embodiments of the present invention.

FIG. 13 is a schematic diagram for showing an example of recording sounds and adding difference information in the progress of a meeting in accordance with one or more embodiments of the present invention. As illustrated in FIG. 13, sound recording data is successively clipped with the timing when a set of differences is extracted.

Figure 14:
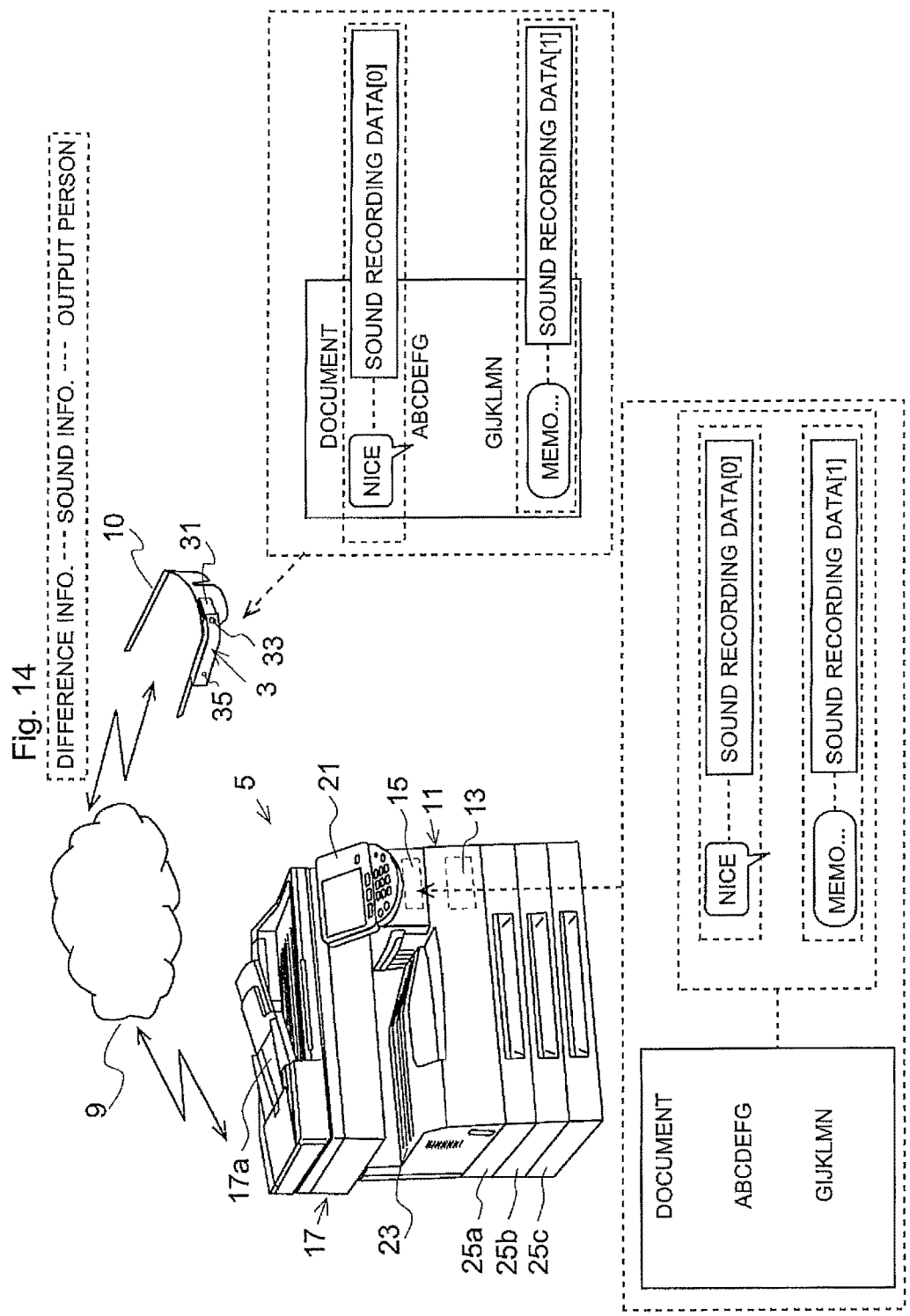
FIG. 14 is a schematic diagram for showing an example of associating difference information with sound information in accordance with one or more embodiments of the present invention.

Next, an interface image output based on pair information will be explained with reference to FIG. 14 through FIG. 16. FIG. 14 is a schematic diagram for showing an example of associating difference information with sound information in accordance with one or more embodiments of the present invention. As illustrated in FIG. 14, the electronic apparatus 3 transmits differential image data and sound recording data associated as pair information to the information processing apparatus 5 through the network 9. In the information processing apparatus 5, the pair information of the differential image data and the sound recording data is associated with the master information corresponding thereto.

Figure 15:
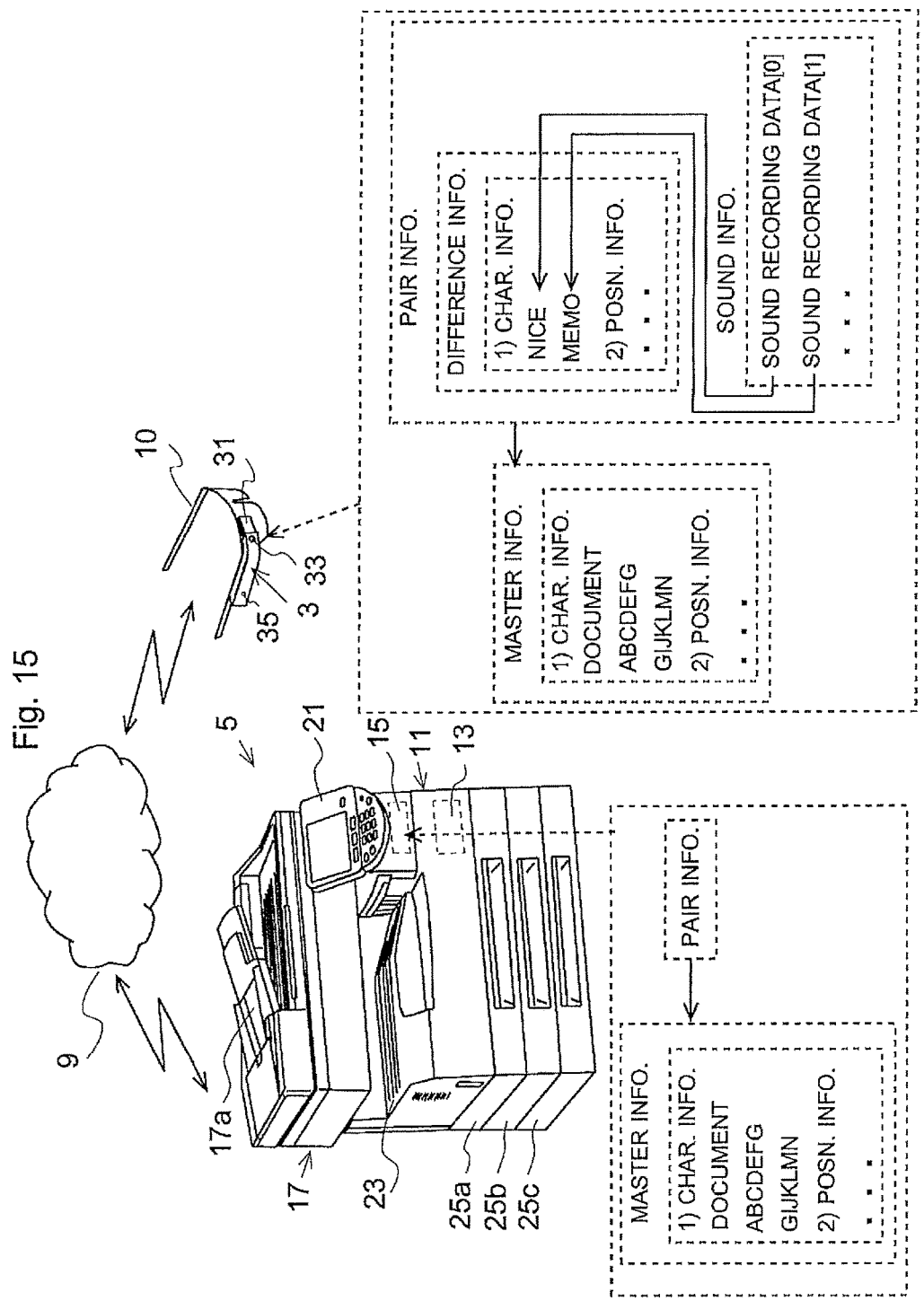
FIG. 15 is a schematic diagram for showing an example of a data structure in which difference information and sound information are associated with each other in accordance with one or more embodiments of the present invention.

FIG. 15 is a schematic diagram for showing an example of a data structure in which difference information and sound information are associated with each other in accordance with one or more embodiments of the present invention. For example, text information is associated with sound information within pair information. The master information in the electronic apparatus 3 is associated with pair information as a unit. On the other hand, in the same manner as in the electronic apparatus 3, the master information in the information processing apparatus 5 is associated with pair information as a unit.

Figure 16:
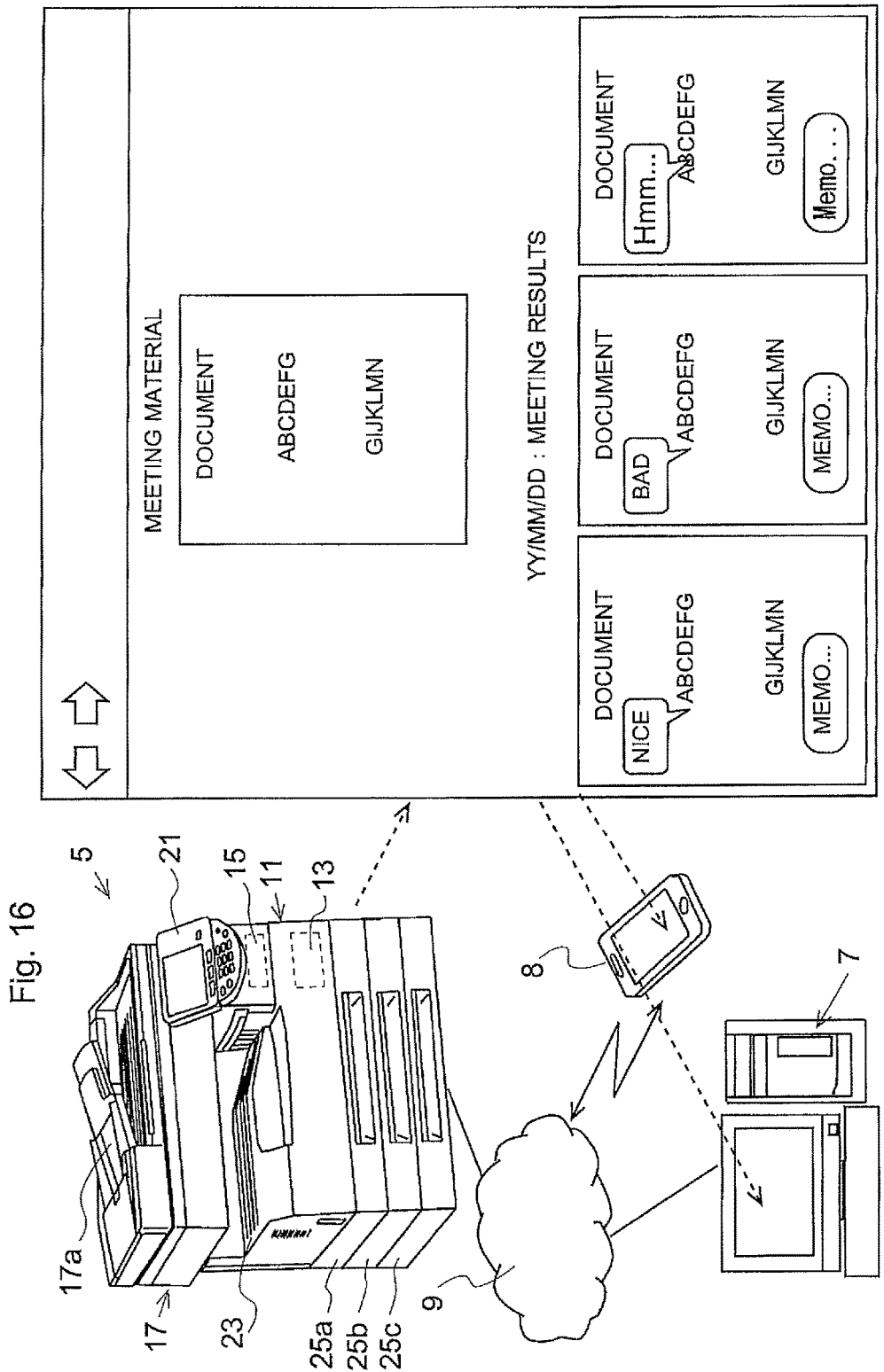
FIG. 16 is a schematic diagram for showing an example of a GUI in which the master information, difference information and sound information are associated with each other in accordance with one or more embodiments of the present invention.

FIG. 16 is a schematic diagram for showing an example of a GUI in which the master information, difference information and sound information are associated with each other in accordance with one or more embodiments of the present invention. As illustrated in FIG. 16, one meeting material corresponds to one master information. In this display, meeting results are arranged side by side in correspondence with one master information. The image of difference information displayed as a meeting result can be operated to retrieve sound information associated with this difference information and reproduce sounds based on the sound information. Incidentally, this interface image is transmitted through the network 9 and displayed on a smartphone 8, a terminal 7 or the like, and sounds are appropriately output.

Figure 19:
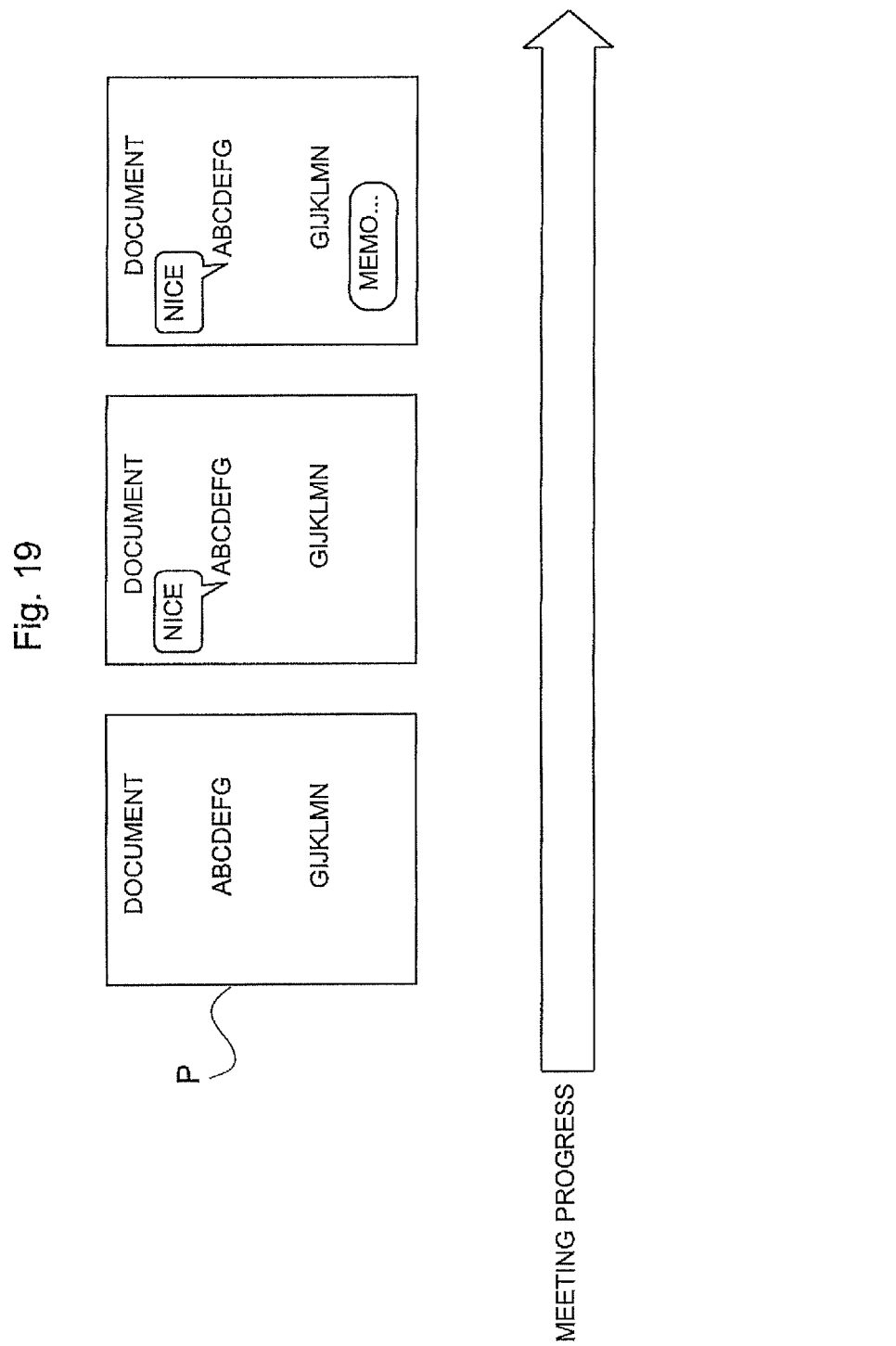
FIG. 19 is a schematic diagram for showing an example of adding difference information in the progress of a meeting in accordance with a prior art technique.
Figure 20:
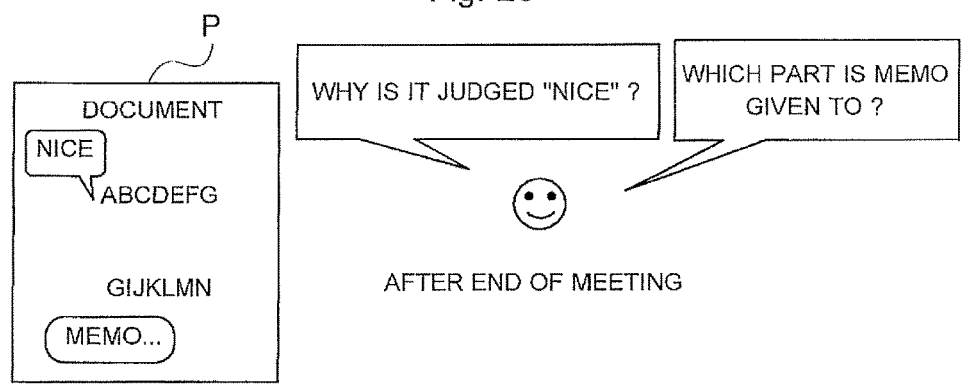
FIG. 20 is a view for schematically explaining the value of the difference information after the completion of a meeting in accordance with the prior art technique.

Next is an explanation of the working effects of one or more embodiments of the present embodiment in comparison with a prior art example. FIG. 19 is a schematic diagram for showing an example of adding difference information in the progress of a meeting in accordance with a prior art technique. FIG. 20 is a view for schematically explaining the value of the difference information after the completion of a meeting in accordance with the prior art technique. As illustrated in FIG. 19, additional matters are written to a meeting material in the progress of the meeting. However, as illustrated in FIG. 20, in many cases, it cannot be remembered why the additional matters are added after the completion of the meeting.

In one or more embodiments, difference information and sound information are associated with each other in the meeting content contained in the same master information by associating the master information with pair information consisting of the difference information and the sound information so that the meanings of the difference information in the meeting content can be confirmed based on the sound information.

Furthermore, in one or more embodiments, the storage destination information of the master information is included in the identification image X formed on a paper medium P so that the location of the master information can be known by reading the identification image X, and therefore the master information can be acquired for comparison.

Furthermore, in one or more embodiments, the interface image serves as an interface through which sound information can be output based on difference information so that the sound information can be confirmed through the interface image in association with the difference information, and therefore the meanings of the difference information can be confirmed.

Furthermore, in one or more embodiments, difference information and sound information are associated with each other for each event, which is an indicator showing a change of meeting content contained in taken image information so that the sound information can be associated with the difference information with the timing when a difference occurs between the meeting content contained in the taken image information and the meeting content contained in the master information, and therefore it is possible to make the time period of occurrence of the difference correspond to the time period of extraction of the sound information.

Furthermore, in one or more embodiments, a sound information clipping period includes a preceding period before starting an event and a succeeding period after terminating the event so that sound information is extracted to include the periods before and after the change of meeting content, and therefore it is possible to extract much of the sound information for confirming the meanings of the difference information.

Furthermore, in one or more embodiments, when the short waiting time is not exceeded by a difference extraction interval, differences are extracted with reference to the master information of the same paper medium P so that the differences relating to the same meeting can be corresponding to the master information of the same paper medium P, and therefore it is possible to perform processes based on the master information corresponding to the meeting.

Furthermore, in one or more embodiments, if the position of the electronic apparatus 3 does not exceed the set movement range, differences are extracted based on the master information of the same paper medium P so that the differences relating to the same meeting can be corresponding to the master information of the same paper medium P, and therefore it is possible to perform processes based on the master information corresponding to the meeting.

Furthermore, in one or more embodiments, the detection cycle, the temporal waiting period or the sound information extracting period can freely be changed so that the various settings can be changed, and therefore it is possible to perform processes in correspondence with the meeting.

Furthermore, in one or more embodiments, the short waiting time or the set movement range can freely be changed so that the various settings can be changed, and therefore it is possible to perform processes in correspondence with the features of participants of the meeting.

Furthermore, in one or more embodiments, if the short waiting time is not exceeded by the difference extraction interval, or if the position of the electronic apparatus 3 does not exceed the set movement range, the detection cycle, the temporal waiting period, the sound information, the short waiting time or the set movement range can freely and dynamically be changed within a change allowable range in accordance with the number of sheets contained in the paper medium P on which print images are formed so that the various settings can be dynamically changed in accordance with the meeting content and the meeting participants, and therefore it is possible to associate difference information with the sound information in a more accurate manner.

Furthermore, in one or more embodiments, if a difference disappears, the association between this difference and sounds is dissolved so that, when an additional matter which has been added is deleted, the additional matter to the paper medium P is not associated with sounds that are added when this additional matter is added, and therefore it is possible to reflect latest information of the meeting.

Furthermore, in one or more embodiments, if the short waiting time is not exceeded by a difference extraction interval at which differences are extracted, or if the position of the electronic apparatus 3 does not exceed the set movement range and differences are extracted, the preceding period before starting an event is set to the extended preceding period so that the period before starting an event can be set to be longer, and therefore even if the differences occur before starting the event, it is possible to extract sound information near the timing when the differences occur.

Furthermore, in one or more embodiments, if a silent state is continued after an event occurs, sound information is extracted with the timing when sounds are generated so that the sound information can be extracted with the speech timing, and therefore it is possible to effectively extract necessary sound information from sound recording information recorded during the meeting.

Furthermore, in one or more embodiments, when starting writing characters to the paper medium P, and detecting generation of sounds, characters written to the paper medium P and sound information are associated with each other in preference to the timing with which a difference is extracted in the detection cycle so that the sound information can be extracted with a more accurate timing than the difference is extracted in the detection cycle, and therefore it is possible to extract necessary sound information from sound recording information during a meeting in a more accurate manner.

Furthermore, in one or more embodiments, when the electronic apparatus 3 does not establish communication with the information processing apparatus 5, difference information and sound information are saved and, when the communication is established, the electronic apparatus 3 transmits the difference information and the sound information so that, even if communication is temporarily not established, the difference information and the sound information shall not be deleted, and therefore it is possible to securely associate the difference information, the sound information and the master information with each other.

In one or more embodiments as described below, similar elements are given similar references as described above, and therefore no redundant description is repeated. In one or more embodiments, the case where a plurality of output persons A through C output one master information will be explained.

Figure 17:
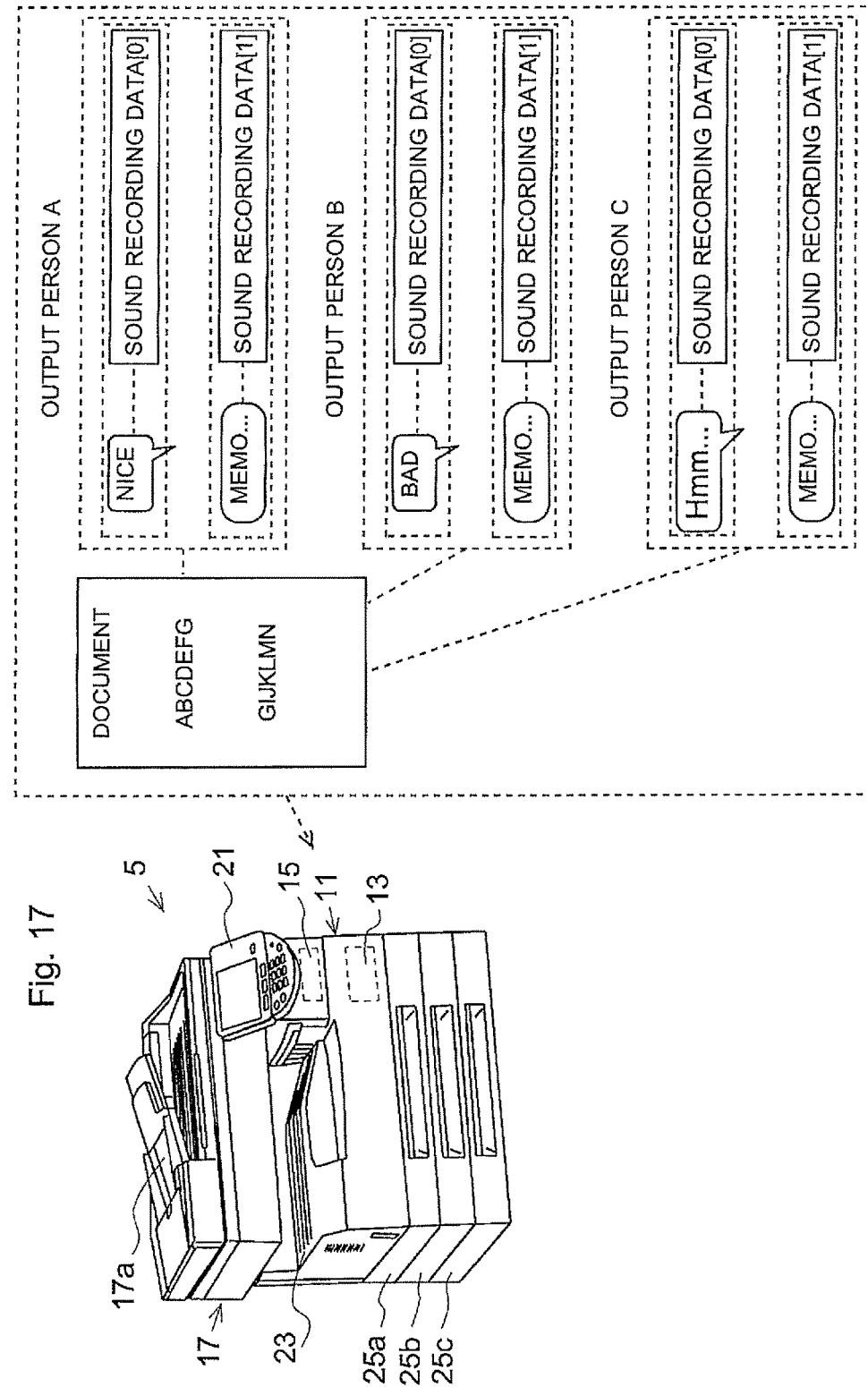
FIG. 17 is a schematic diagram for showing an example of associating difference information with sound information in accordance with one or more embodiments of the present invention.

FIG. 17 is a schematic diagram for showing an example of associating difference information with sound information in accordance with one or more embodiments of the present invention. As illustrated in FIG. 17, pair information of differential image data and sound recording data created by the output person A, pair information of differential image data and sound recording data created by the output person B and pair information of differential image data and sound recording data created by the output person C are associated with one master information. Specifically, the pair information is associated with the master information for each output person information.

Accordingly, in accordance with one or more embodiments, pair information is associated with the master information for each output person information so that the master information and the pair information are associated with each other for each output person, and therefore it is possible to associate additional matters of each participant with the meeting content used in the same meeting.

In one or more embodiments described below, similar elements are given similar references as described above, and therefore no redundant description is repeated. The interface image of one or more embodiments described below differs from those described above.

FIG. 18 is a schematic diagram for showing an example of a GUI in which the master information, difference information and sound information are associated, with each other in accordance with one or more embodiments of the present invention. As illustrated in FIG. 18, the interface image includes an image showing the progress state of a meeting. Accordingly, it is possible to reproduce the differential image data and the sound recording data at an arbitrary point in time by operating the image showing the progress state of a meeting. In other words, the image control unit 154 associates the image showing the progress state of a meeting with sound information and difference information.

As has been discussed above, in one or more embodiments, the image showing the progress state of a meeting, sound information and difference information are associated with each other so that the image showing the progress state of a meeting, the sound information and the difference information can be confirmed, and therefore it is possible to confirm the flow of a speech when the difference information occurs.

The information processing system 1 has been explained in accordance with one or more embodiments of the present invention. However, it is not intended to limit the present invention to the precise form described, and obviously many modifications and variations are possible without departing from the scope of the invention.

For example, in one or more embodiments, the image control unit 154 is explained as a function that is implemented with the control unit 15. One or more embodiments of the present invention are not limited thereto. For example, the image control unit 154 can be provided as a separate unit independently from the control unit 15.

Also, while the electronic apparatus 3 is attached to the eyeglasses 10 in the above example, one or more embodiments of the present invention are not limited thereto, but the eyeglasses 10 and the electronic apparatus 3 can be integrated as one unit.

While the electronic apparatus 3 and the information processing apparatus 5 exchange data as the information processing system 1 in the above example, one or more embodiments of the present invention are not limited thereto, but the information processing system 1 may be implemented with the information processing apparatus 5 and the smartphone 8 provided with the functionality of the electronic apparatus 3 and exchange data with the information processing apparatus 5. In this case, an application for implementing the functionality of the electronic apparatus 3 is installed in the smartphone 8.

Also, while the identification image X contains a two-dimensional code in the above example, one or more embodiments of the present invention are not limited thereto, but a one-dimensional code such as the barcode or a three-dimensional code such as the PM code can be used instead. Furthermore, the two-dimensional code of the identification image X is the QR code in the above example, one or more embodiments of the present invention are not limited thereto, but the CP code or the like can be used instead. Namely, the code is not particularly limited as long as the attribute information of the master information can be acquired from the identification image information by reading the identification image X with the imaging unit 33.

While the meeting material consists of one sheet in the above example, one or more embodiments of the present invention are applicable to a meeting material consisting of a plurality of sheets. Specifically, one identification image X may be given to one sheet of a paper medium P. In such a case where sheets of a paper medium P and identification images X are provided in a one-to-one correspondence, an identifier may be contained to identify each identification image X. Alternatively, one identification image X may be given to any one of a plurality of sheets of a paper medium P. Namely, it is only required that the electronic apparatus 3 can acquire the master information as base data.

Also, in the case where the paper medium P consists of a plurality of sheets as described above, the master information includes information the plurality of sheets. Accordingly, when extracting a difference between the print image of each page of the paper medium P and the master information corresponding thereto, the pages of the master information that correspond to the difference based on the taken image information, which is taken by the imaging unit 33, are identified. For example, the page number may be referred to so that it can be identified which page corresponds. Alternatively, for example, by extracting characteristic points from the taken image information and extracting characteristic points from the print image reproduced by the master information, it may be identified which page corresponds based on coincident and similar parts therebetween.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An information processing system comprising:
    an electronic imaging apparatus; and
    a multi-function peripheral (MFP) apparatus that forms a print image on a paper medium and exchanges information with the electronic imaging apparatus, wherein
    the electronic imaging apparatus comprises:
        an imaging unit that takes image information of the paper medium during a repeating detection cycle;
        an extracting unit that extracts a difference between a first meeting content contained in the taken image information and a second meeting content contained in master information saved in the MFP apparatus, wherein the second meeting content is same as the first meeting content at the time when the imaging unit starts taking the image information;
        a sound recording unit that records a surrounding sound while a meeting is being held with respect to the second meeting content; and
        a terminal side association processing unit that, in correspondence with the extraction of the difference, associates difference information of the difference with sound information of the recorded surrounding sound and with the timing of when the difference is detected,
    the MFP apparatus forms the print image on the paper medium based on the second meeting content, and
    the MFP apparatus comprises:
        a main body side association processing unit that associates the master information with pair information that includes the difference information and the sound information, which are associated with each other by the terminal side association processing unit.

2. The information processing system of claim 1 wherein the MFP apparatus further comprises:
    a storage unit that stores the master information and attribute information of the master information;
    an identification processing unit that generates identification image information from the attribute information stored in the storing unit; and
    an image processing unit that forms the print image on the paper medium based on meeting material image information generated from the second meeting content contained in the master information and the identification image information generated by the identification processing unit, wherein
    the image processing unit forms, as the print image, a meeting material image based on the meeting material image information and an identification image based on the identification image information, and
    the identification image information includes storage destination information of the master information, which is an item of the attribute information.

3. The information processing system of claim 2 wherein the MFP apparatus further comprises:
    an image control unit that controls an interface image that is output with any one of the master information, the attribute information, the difference information, and the sound information, wherein
    the interface image serves as an interface to output the sound information based on the difference information, and
    the attribute information includes identification information for identifying the meeting content contained in the master information, host information about a host of the meeting, or output person information about an output person who commands formation of the print image on the paper medium in addition to the storage destination information of the master information.

4. The information processing system of claim 3 wherein the electronic imaging apparatus further comprises:
    an event management unit that manages the differences extracted by the extracting unit in units of events, wherein
    the extracting unit extracts the sound information in correspondence with the event managed by the event management unit,
    the event serves as an indicator showing a change in the taken image information in the progress of the meeting, starts when the difference is extracted, and terminates if no difference is extracted anew for a temporal waiting period, and
    the terminal side association processing unit associates the sound information with the difference information for each event.

5. The information processing system of claim 4 wherein the terminal side association processing unit has a period for clipping the sound information, and
    the period comprises a preceding period before starting the event and a succeeding period after terminating the event.

6. The information processing system of claim 5 wherein if a predetermined waiting time is not exceeded by an extraction interval at which the differences are extracted, the extracting unit extracts the differences based on the same master information.

7. The information processing system of claim 6 wherein if the position of the electronic imaging apparatus does not exceed a set movement range, the extracting unit extracts the difference based on the same master information.

8. The information processing system of claim 7 wherein the detection cycle, the temporal waiting period or the sound information clipping period can be changed.

9. The information processing system of claim 8 wherein the predetermined waiting time or the set movement range can be changed.

10. The information processing system of claim 9 wherein if the predetermined waiting time is not exceeded by the extraction interval, or if the position of the electronic imaging apparatus does not exceed the set movement range, the detection cycle, the temporal waiting period, the sound information clipping period, the predetermined waiting time or the set movement range can dynamically be changed within a change allowable range in accordance with the number of sheets contained in the paper medium on which the print image is formed.

11. The information processing system of claim 10 wherein if the difference disappears while the meeting is being held, the terminal side association processing unit dissolves the association between the difference information and the sound information.

12. The information processing system of claim 11 wherein
if the predetermined waiting time is not exceeded by the extraction interval at which differences are extracted, or if the set movement range is not exceeded by the position of the electronic imaging apparatus and differences are extracted, the terminal side association processing unit sets the preceding period before starting the event to an extended preceding period.

13. The information processing system of claim 12 further comprising:
a speech recognition unit that recognizes a speech, wherein
if a silent state is continued after the event occurs, the terminal side association processing unit starts extracting the sound information with the timing when the speech recognition unit recognizes a speech.

14. The information processing system of claim 13 further comprising:
a character recognition unit that recognizes characters, wherein
when the character recognition unit detects start of writing characters to the paper medium, and the speech recognition unit detects a speech to be recognized, the terminal side association processing unit associates the sound information and characters written to the paper medium with each other in preference to the timing with which a difference is extracted in the detection cycle.

15. The information processing system of claim 14 wherein
the pair information is associated with the master information for each output person information.

16. The information processing system of claim 3 wherein
the interface image includes an image showing the progress state of the meeting, and
the image control unit associates the image showing the progress state of the meeting with the sound information and the difference information.

17. The information processing system of claim 1 wherein
the electronic imaging apparatus further comprises a communication control unit that acquires the master information, which is used to extract differences with the extracting unit, based on the storage destination information of the master information,
the MFP apparatus further comprises an information determination unit that determines whether or not the pair information is transmitted,
when the communication control unit does not establish communication with the MFP apparatus, pair information is saved and when the communication is established, the communication control unit transmits the pair information to the MFP apparatus, and
when the information determination unit determines that the pair information is transmitted, the main body side association processing unit associates the pair information with the master information.

18. An electronic imaging apparatus that exchanges information with a multi-functional peripheral (MFP) apparatus that forms a print image on a paper medium, comprising:
an imaging unit that takes image information of the paper medium during a repeating detection cycle;
an extracting unit that extracts a difference between a first meeting content contained in the taken image information and a second meeting content contained in master information saved in the MFP apparatus, wherein the second meeting content is same as the first meeting content at the time when the imaging unit starts taking the image information;
a sound recording unit that records a surrounding sound while a meeting is being held with respect to the second meeting content;
a terminal side association processing unit that, in correspondence with the extraction of the difference, associates difference information of the difference with sound information of the recorded surrounding sound and with the timing of when the difference is detected; and
a communication unit that transmits, to the MFP apparatus, pair information including the difference information and the sound information that are associated with each other by the terminal side association processing unit, and a command to associate the pair information with the master information, wherein
the MFP apparatus forms the print image on the paper medium based on the second meeting content.

19. The electronic imaging apparatus of claim 18 wherein
the terminal side association processing unit associates the sound information with the difference information for each event, and
the event serves as an indicator showing a change in the taken image information in the progress of a meeting, starts when a difference is extracted, and terminates if no difference is extracted anew for a temporal waiting period.

20. A multi-functional peripheral (MFP) apparatus that exchanges information with an electronic imaging apparatus, the MFP apparatus comprising:
a storage unit that stores master information and attribute information of the master information;
an identification processing unit that generates identification image information from the attribute information;
an image processing unit that forms a print image on a paper medium based on meeting material image information generated from a second meeting content contained in the master information and the identification image information; and
a main body side association processing unit that associates the master information and pair information with each other, wherein
the pair information includes:
sound information of recorded surrounding sounds; and
difference information of a difference between:
a first meeting content contained in taken image information of the paper medium, and
the second meeting content contained in the master information.

21. An information processing method performed by an information processing system that includes an electronic imaging apparatus and a multi-functional peripheral (MFP) apparatus that forms a print image on a paper medium and exchanges information with the electronic imaging apparatus, the method comprising:
in the electronic imaging apparatus side:
taking image information of the paper medium during a repeating detection cycle by an imaging unit;
extracting a difference between a first meeting content contained in the taken image information and a second meeting content contained in master information saved in the MFP apparatus, wherein the second meeting content is same as the first meeting content at the time when the imaging unit starts taking the image information;

recording a surrounding sound while a meeting is being held with respect to the second meeting content; and in correspondence with the extraction of the difference, associating difference information of the difference with sound information of the recorded surrounding sound and with the timing of when the difference is detected, the MFP apparatus forms the print image on the paper medium based on the second meeting content, and in the MFP apparatus side:
associating the master information with pair information including the difference information and the sound information that are associated with each other.

22. An electronic imaging apparatus processing method performed by an electronic imaging apparatus that exchanges information with a multi-functional peripheral (MFP) apparatus that forms a print image on a paper medium, the method comprising:

taking image information of the paper medium during a repeating detection cycle by an imaging unit;

extracting a difference between a first meeting content contained in the taken image information and a second meeting content contained in master information saved in the MFP apparatus, wherein the second meeting content is same as the first meeting content at the time when the imaging unit starts taking the image information;

recording a surrounding sound while a meeting is being held with respect to the second meeting content;

in correspondence with the extraction of the difference, associating difference information of the difference with sound information of the recorded surrounding sound and with the timing of when the difference is detected; and transmitting, to the MFP apparatus, pair information including the difference information and the sound information that are associated with each other, and a command to associate the pair information with the master information, wherein the MFP apparatus forms the print image on the paper medium based on the second meeting content.

23. A non-transitory computer readable medium including programmed instructions, wherein the instructions, when executed by a computer, cause the computer to control an electronic imaging apparatus that exchanges information with a multi-functional peripheral (MFP) apparatus that forms a print image on a paper medium, and causes the computer to function as:

an imaging unit that takes image information of the paper medium during a repeating detection cycle;

an extracting unit that extracts a difference between a first meeting content contained in the taken image information and a second meeting content contained in master information saved in the MFP apparatus, wherein the second meeting content is same as the first meeting content at the time when the imaging unit starts taking the image information;

a sound recording unit that records a surrounding sound while a meeting is being held with respect to the second meeting content;

a terminal side association processing unit that, in correspondence with the extraction of the difference, associates difference information of the difference with sound information of the recorded surrounding sound and with the timing of when the difference is detected; and a communication unit that transmits, to the MFP apparatus, pair information including the difference information and the sound information that are associated with each other, and a command to associate the pair information with the master information, wherein the MFP apparatus forms the print image on the paper medium based on the second meeting content.

24. An information processing method performed by a multi-functional peripheral (MFP) apparatus that exchanges information with an electronic imaging apparatus, the method comprising:

storing master information and attribute information of the master information;

generating identification image information from the attribute information; and forming a print image on a paper medium based on meeting material image information generated from a second meeting content contained in the master information and the identification image information; and associating the master information and pair information with each other, wherein the pair information includes:
sound information of recorded surrounding sounds; and
difference information of a difference between:
a first meeting content contained in taken image information of the paper medium, and
the second meeting content.

25. A non-transitory computer readable medium including programmed instructions, wherein the instructions, when executed by a computer, cause the computer to control a multi-functional peripheral (MFP) apparatus that exchanges information with an electronic imaging apparatus, and causes the computer to function as:

a storage unit that stores master information and attribute information of the master information;

an identification processing unit that generates identification image information from the attribute information;

an image processing unit that forms a print image on a paper medium based on meeting material image information generated from a second meeting content contained in the master information and the identification image information; and a main body side association processing unit that associates the master information and pair information with each other, wherein the pair information includes:
sound information of recorded surrounding sounds; and
difference information of a difference between:
a first meeting content contained in taken image information of the paper medium, and
a second meeting content.

* * * * *